US012572055B2

(12) United States Patent
Biswas et al.

(10) Patent No.: US 12,572,055 B2
(45) Date of Patent: Mar. 10, 2026

(54) MICROLENS ARRAY WITH BUILT-IN AIR GAP

(71) Applicant: LUMILEDS LLC, San Jose, CA (US)

(72) Inventors: Sudipta Romen Biswas, Santa Clara, CA (US); Yu-Chen Shen, Sunnyvale, CA (US); Grigoriy Basin, San Francisco, CA (US)

(73) Assignee: LUMILEDS SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 19/001,078

(22) Filed: Dec. 24, 2024

(65) Prior Publication Data

US 2025/0130481 A1     Apr. 24, 2025

Related U.S. Application Data

(63) Continuation of application No. PCT/US2023/026210, filed on Jun. 26, 2023.

(60) Provisional application No. 63/357,620, filed on Jun. 30, 2022, provisional application No. 63/432,612, filed on Dec. 14, 2022, provisional application No. 63/456,191, filed on Mar. 31, 2023.

(51) Int. Cl.
G03B 15/05          (2021.01)

(52) U.S. Cl.
CPC ...... G03B 15/05 (2013.01); G03B 2215/0503 (2013.01); G03B 2215/0592 (2013.01)

(58) Field of Classification Search
CPC ............ G03B 15/05; G03B 2215/0503; G03B 2215/0592; F21V 5/007; F21V 9/30; H10H 20/855; H10H 29/142; H10H 20/851
See application file for complete search history.

(56) References Cited

U.S. PATENT DOCUMENTS

2015/0355470 A1* 12/2015 Herschbach .............. F21V 5/08
                                                             362/11
2019/0243214 A1* 8/2019 Penaflor ................. H04N 23/56
2019/0326490 A1   10/2019 Hailberger et al.
                              (Continued)

FOREIGN PATENT DOCUMENTS

KR      20210112806 A     9/2021
WO      2024/006197 A1    1/2024

OTHER PUBLICATIONS

From the EPO as the ISA, "Notification of Transmittal of the International Search Report and the Written Opinion of the International Searching Authority, or the Declaration", PCT/US2023/026210, Oct. 11, 2023, 10 pages.

*Primary Examiner* — Bao Q Truong

(57) ABSTRACT

A microlens array comprises an array of microlenses on a flat base. A spacer located along the periphery of the microlens array protrudes away from the plane of the base. The microlens array may be arranged in combination with one or more LEDs or pcLEDs with the spacer positioned between the microlens array and the LEDs or pcLEDs and thus spacing the microlenses away from the LED or pcLEDs. Arranged in this manner, the surface of the microlens array facing the LEDs or pcLEDs and light emitting surfaces of the LEDs or pcLEDs together define an air filled or evacuated gap between the microlens array and the LEDs or pcLEDs, which improves the performance of the microlens array in collimating or partially collimating light emitted by the LEDs or pcLEDs.

19 Claims, 28 Drawing Sheets

(56)  References Cited

U.S. PATENT DOCUMENTS

2020/0066944 A1*   2/2020  Lee ...................... H10H 20/856
2020/0259052 A1     8/2020  Hailberger et al.
2022/0316683 A1*  10/2022  Yoshida .................. F21V 5/045

* cited by examiner

600

710

712

714 — BATTERY(S)

716 — RADIO(S)

718 — SENSOR(S)

720 — VIDEO GENERATION PROCESSOR(S)

722 — LIGHT SOURCE(S)

724 — MODULATOR(S)

726 — MODULATION PROCESSOR(S)

728 — BEAM COMBINER(S)

730 — PROJECTION OPTIC(S)

732 — SCREEN(S)

734 — LENS(ES)

800

810

815

820

800

815

810

SW

W

L

MICROLENS ARRAY WITH BUILT-IN AIR GAP

CROSS REFERENCE TO RELATED APPLICATIONS

This application is a continuation of International Patent Application PCT/US2023/026210 filed 26 Jun. 2023. PCT/US2023/026210 claims benefit of priority to U.S. Provisional Patent Application 63/357,620 filed 30 Jun. 2022, U.S. Provisional Patent Application 63/432,612 filed 14 Dec. 2022, and U.S. Provisional Patent Application 63/456,191 filed 31 Mar. 2023. Each of the patent applications cited in this paragraph is incorporated herein by reference in its entirety.

FIELD OF THE INVENTION

The invention relates generally to microlens arrays and to light sources comprising microlens arrays in combination with LEDs or pcLEDs.

BACKGROUND

Semiconductor light emitting diodes and laser diodes (collectively referred to herein as "LEDs") are among the most efficient light sources currently available. The emission spectrum of an LED typically exhibits a single narrow peak at a wavelength determined by the structure of the device and by the composition of the semiconductor materials from which it is constructed. By suitable choice of device structure and material system, LEDs may be designed to operate at ultraviolet, visible, or infrared wavelengths.

LEDs may be combined with one or more wavelength converting materials (generally referred to herein as "phosphors") that absorb light emitted by the LED and in response emit light of a longer wavelength. For such phosphor-converted LEDs ("pcLEDs"), the fraction of the light emitted by the LED that is absorbed by the phosphors depends on the amount of phosphor material in the optical path of the light emitted by the LED, for example on the concentration of phosphor material in a phosphor layer disposed on or around the LED and the thickness of the layer. Phosphor-converted LEDs may be designed so that all the light emitted by the LED is absorbed by one or more phosphors, in which case the emission from the pcLED is entirely from the phosphors. In such cases the phosphor may be selected, for example, to emit light in a narrow spectral region that is not efficiently generated directly by an LED. Alternatively, pcLEDs may be designed so that only a portion of the light emitted by the LED is absorbed by the phosphors, in which case the emission from the pcLED is a mixture of light emitted by the LED and light emitted by the phosphors. By suitable choice of LED, phosphors, and phosphor composition, such a pcLED may be designed to emit, for example, white light having a desired color temperature and desired color-rendering properties.

Inorganic LEDs and pcLEDs have been widely used to create different types of displays, matrices and light engines including automotive adaptive headlights, augmented-reality (AR) displays, virtual-reality (VR) displays, mixed-reality (MR) displays (AR, VR, and MR systems referred to herein as visualization systems), smart glasses and displays for mobile phones, smart watches, monitors and TVs, and flash illumination for cameras in mobile phones. Individual LEDs or pcLEDs in these architectures can have an area of a few square millimeters down to a few square micrometers (e.g., microLEDs) depending on the matrix or display sized and its pixel per inch requirements.

Collimating or partially collimating the light emitted from LEDs or pcLEDs is desirable to provide more directional light output, which may be advantageous in the applications listed above.

SUMMARY

This specification discloses microlens arrays and lighting apparatus (light sources) comprising microlens arrays in combination with LEDs or pcLEDs. A microlens is a small lens typically having a diameter less than a millimeter.

The microlens arrays disclosed herein comprise a plurality of microlenses (e.g., hemispherical, aspherical, or other lens-shaped bumps) arranged on a flat base. A spacer located along the periphery of the microlens array protrudes away from the plane of the base. The microlens array may be arranged in combination with one or more LEDs or pcLEDs with the spacer positioned between the microlens array and the LEDs or pcLEDs and thus spacing the microlenses away from the LED or pcLEDs. Arranged in this manner, the surface of the microlens array facing the LEDs or pcLEDs and light emitting surfaces of the LEDs or pcLEDs together define a gap between the microlens array and the LEDs or pcLEDs. This gap may be filled for example by ambient air or inert gases, or with another transparent material having an index of refraction significantly lower than that of the microlens array and the LEDs or pcLEDs. Alternatively, the gap may be evacuated. (This disclosure uses the term "air" to refer to ambient air as well as to inert gases).

If air filled or evacuated, the gap has an index of refraction of ~1. It's location between the microlens array and the LEDs or pcLEDs, which have larger indices of refraction than the gap, improves the performance of the microlens array in collimating or partially collimating light emitted by the LEDs or pcLEDs. Filling the gap with another transparent material having an index of refraction significantly lower than that of the microlens array and the LED or pcLEDs similarly improves the performance of the microlens array.

The microlenses may be located on the (front) surface of the base facing away from the LEDs or pcLEDs. Alternatively, or in addition, the microlenses may be located on the (rear) surface of the base facing the LEDs or pcLEDs. The microlenses may all have the same radius of curvature. Alternatively, the radii of curvature of the microlenses may vary with their location in the array. Here, radius of curvature refers to the actual radius of curvature of a lens surface having spherical curvature, or to the approximate radius of curvature of a lens surface having a non-spherical curvature.

The microlenses, base, and spacer may be formed as a single integral structure from a transparent material such as, for example, glass or silicone. Alternatively, the microlenses and the base may be formed as a single integral structure from a transparent material and the spacer may be a separately formed structure (optionally, also transparent) attached to the base.

Two or more microlens arrays as described above may be stacked, with one microlens array further collimating the output of the other.

A microlens array as described herein may be used in combination with a single LED or pcLED. Alternatively, such a microlens array may be used in combination with an array of LEDs or pcLEDs, for example with a segmented monolithic array of LEDs or pcLEDs.

In one variation a light emitting apparatus comprises a light emitting diode, a wavelength converting structure disposed on or adjacent to a light emitting surface of the light emitting diode, and an integrally formed microlens array comprising a planar base, a plurality of microlenses arranged on the planar base, and a spacer protruding out of the plane of the base along peripheral portions of the base. The microlens array is spaced apart from a light emitting surface of the wavelength converting structure by the spacer and configured to collimate or partially collimate light emitted through the light emitting surface of the wavelength converting structure. The light emitting surface of the wavelength converting structure and a surface of the microlens array together define an evacuated or air-filled gap between the wavelength converting structure and the microlens array.

The microlens array may be spaced apart from the light emitting surface of the wavelength converting structure by the spacer extending from peripheral portions of the base to peripheral portions of the light emitting surface of the wavelength converting structure.

Alternatively, if the light emitting apparatus comprises an optically isolating side coat disposed adjacent to the wavelength converting structure, the microlens array may be spaced apart from the light emitting surface of the wavelength converting structure by the spacer extending from peripheral portions of the base to a surface of the optically isolating side coat.

As another alternative, the spacer may comprise optically isolating material and the microlens array may be spaced apart from the light emitting surface of the wavelength converting structure by the spacer extending from peripheral portions of the base to a substrate supporting the light emitting diode. In such variations the spacer may also function similarly to and replace an optically isolating side coat such as referred to above.

In another variation a light emitting apparatus comprises a light emitting diode and an integrally formed microlens array comprising a planar base, a plurality of microlenses arranged on the planar base, and a spacer protruding out of the plane of the base along peripheral portions of the base. The microlens array is spaced apart from a light emitting surface of the light emitting diode by the spacer and configured to collimate or partially collimate light emitted through the light emitting surface of the light emitting diode. The light emitting surface of the light emitting diode and a surface of the microlens array together define an evacuated or air-filled gap between the light emitting diode and the microlens array.

The microlens array may be spaced apart from the light emitting surface of the light emitting diode by the spacer extending from peripheral portions of the base to peripheral portions of the light emitting surface of the light emitting diode.

Alternatively, if the light emitting apparatus comprises an optically isolating side coat disposed adjacent to the wavelength converting structure, the microlens array may be spaced apart from the light emitting surface of the light emitting diode by the spacer extending from peripheral portions of the base to a surface of the optically isolating side coat.

As another alternative, the spacer may comprise optically isolating material and the microlens array may be spaced apart from the light emitting surface of the light emitting diode by the spacer extending from peripheral portions of the base to a substrate supporting the light emitting diode. In such variations the spacer may also function similarly to and replace an optically isolating side coat such as referred to above.

In another variation a light emitting apparatus comprises a monolithic array of light emitting diodes, a wavelength converting structure disposed on or adjacent to light emitting surfaces of the light emitting diodes, and an integrally formed microlens array comprising a planar base, a plurality of microlenses arranged on the planar base, and a spacer protruding out of the plane of the base along peripheral portions of the base. The microlens array is spaced apart from a light emitting surface of the wavelength converting structure by the spacer and configured to collimate or partially collimate light emitted through the light emitting surface of the wavelength converting structure. The light emitting surface of the wavelength converting structure and a surface of the microlens array together define an evacuated or air-filled gap between the wavelength converting structure and the microlens array.

The light emitting diodes or groups of the light emitting diodes may be individually operable. The light emitting diodes may be microLEDs.

The microlens array may be spaced apart from the light emitting surface of the wavelength converting structure by the spacer extending from peripheral portions of the base to peripheral portions of the light emitting surface of the wavelength converting structure.

Alternatively, if the light emitting apparatus comprises an optically isolating side coat disposed adjacent to the wavelength converting structure, the microlens array may be spaced apart from the light emitting surface of the wavelength converting structure by the spacer extending from peripheral portions of the base to a surface of the optically isolating side coat.

As another alternative, the spacer may comprise optically isolating material and the microlens array may be spaced apart from the light emitting surface of the wavelength converting structure by the spacer extending from peripheral portions of the base to a substrate supporting the light emitting diode. In such variations the spacer may also function similarly to and replace an optically isolating side coat such as referred to above.

The light emitting apparatus may comprise a plurality of optical isolation barriers disposed in the base of the microlens array with individual ones of the optical isolation barriers arranged parallel to and overlying streets in the array of light emitting diodes. The optical isolation barriers may intersect to form a grid. The optical isolation barriers may extend out of the base of the microlens array into the gap between the wavelength converting structure and the microlens array. The optical isolation barriers may extend across the gap between the wavelength converting structure and the microlens array.

In another variation a light emitting apparatus comprises a monolithic array of light emitting diodes and an integrally formed microlens array comprising a planar base, a plurality of microlenses arranged on the planar base, and a spacer protruding out of the plane of the base along peripheral portions of the base. The microlens array is spaced apart light emitting surfaces of the light emitting diodes by the spacer and configured to collimate or partially collimate light emitted through the light emitting surfaces of the light emitting diodes. The light emitting surfaces of the array of light emitting diodes and a surface of the microlens array together define an evacuated or air-filled gap between the array of light emitting diodes and the microlens array.

The light emitting diodes or groups of the light emitting diodes may be individually operable. The light emitting diodes may be microLEDs.

The microlens array may be spaced apart from the light emitting surfaces of the light emitting diodes by the spacer extending from peripheral portions of the base to peripheral portions of the array of light emitting diodes.

Alternatively, if the light emitting apparatus comprises an optically isolating side coat disposed adjacent to the wavelength converting structure, the microlens array may be spaced apart from the light emitting surfaces of the light emitting diodes by the spacer extending from peripheral portions of the base to a surface of the optically isolating side coat.

As another alternative, the spacer may comprise optically isolating material and the microlens array may be spaced apart from the light emitting surfaces of the light emitting diodes by the spacer extending from peripheral portions of the base to a substrate supporting the light emitting diodes. In such variations the spacer may also function similarly to and replace an optically isolating side coat such as referred to above.

The light emitting apparatus may comprise a plurality of optical isolation barriers disposed in the base of the microlens array with individual ones of the optical isolation barriers arranged parallel to and overlying streets in the array of light emitting diodes. The optical isolation barriers may intersect to form a grid. The optical isolation barriers may extend out of the base of the microlens array into the gap between the array of light emitting diodes and the microlens array. The optical isolation barriers may extend across the gap between the array of light emitting diodes and the microlens array.

The microlens arrays and light emitting apparatus disclosed herein may be used, for example, in the various devices and applications listed above in the Background section and may be particularly suitable for camera flash systems and automotive applications.

A light emitting diode device as referred to herein may comprise, for example: a single light emitting diode, in which case the light emitting surface of the light emitting diode device as referred to herein may be a light emitting surface of the light emitting diode; a single light emitting diode and a wavelength converting structure disposed on or adjacent to a light emitting surface of the light emitting diode, in which case the light emitting surface of the light emitting diode device may be a light emitting surface of the wavelength converting structure; a monolithic array of light emitting diodes, in which case the light emitting surface of the light emitting diode device may comprise light emitting surfaces of the light emitting diodes; or a monolithic array of light emitting diodes and a wavelength converting structure disposed on or adjacent to light emitting surfaces of the light emitting diodes; in which case the light emitting surface of the light emitting diode device may be a light emitting surface of the wavelength converting structure.

These and other embodiments, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

These and other embodiments, features and advantages of the present invention will become more apparent to those skilled in the art when taken with reference to the following more detailed description of the invention in conjunction with the accompanying drawings that are first briefly described.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention.

Figure 1:
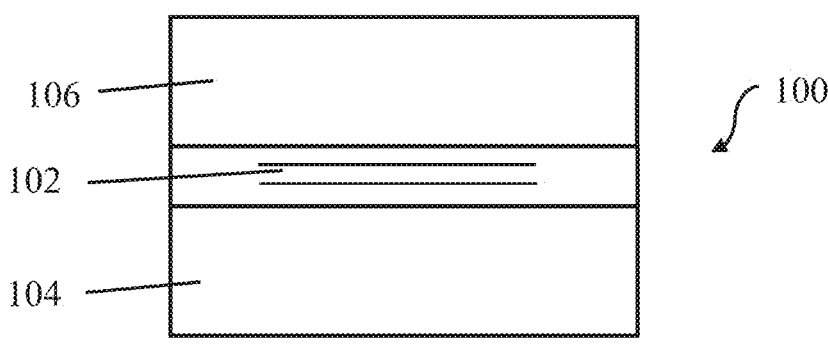
FIG. 1 shows a schematic cross-sectional view of an example pcLED.

FIG. 1 shows an example of an individual pcLED 100 comprising a light emitting semiconductor diode (LED) structure 102 disposed on a substrate 104, and a phosphor layer 106 (which may also be referred to herein as a wavelength converting structure) disposed on the LED. Light emitting semiconductor diode structure 102 typically comprises an active region disposed between n-type and p-type layers. Application of a suitable forward bias across the diode structure results in emission of light from the active region. The wavelength of the emitted light is determined by the composition and structure of the active region.

The LED may be, for example, a III-Nitride LED that emits ultraviolet, blue, green, or red light. LEDs formed from any other suitable material system and that emit any other suitable wavelength of light may also be used. Other suitable material systems may include, for example, III-Phosphide materials, III-Arsenide materials, and II-VI materials.

Any suitable phosphor materials may be used, depending on the desired optical output and color specifications from the pcLED. Phosphor layers may for example comprise phosphor particles dispersed in or bound to each other with a binder material or be or comprise a sintered ceramic phosphor plate.

Figure 2A:
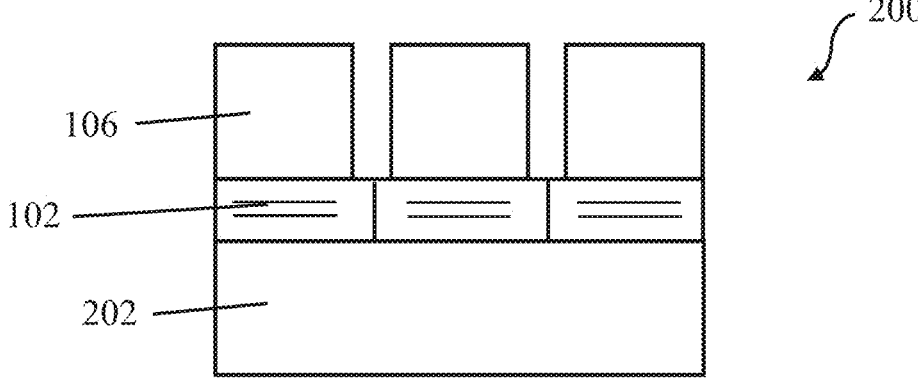
FIGS. 2A and 2B show, respectively, cross-sectional and top schematic views of an array of pcLEDs.
Figure 2B:
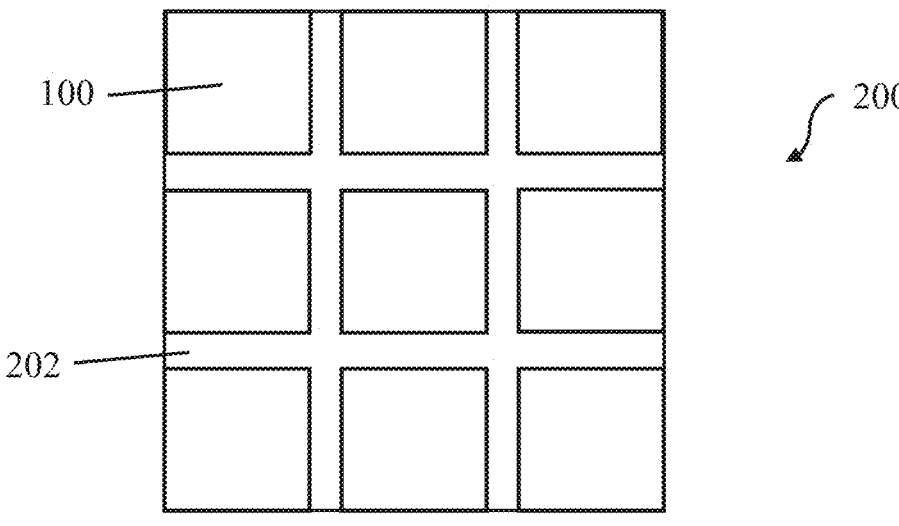

FIGS. 2A-2B show, respectively, cross-sectional and top views of an array 200 of pcLEDs 100 including phosphor layers 106 disposed on a substrate 202. Such an array may include any suitable number of pcLEDs arranged in any suitable manner. In the illustrated example the array is depicted as formed monolithically on a shared substrate, but alternatively an array of LEDs or pcLEDs may be formed from individual mechanically separate LEDs or pcLEDs. Substrate 202 may optionally comprise CMOS circuitry for driving the LEDs and may be formed from any suitable materials.

Although FIGS. 2A-2B show a three-by-three array of nine pcLEDs, such arrays may include for example tens, hundreds, or thousands of LEDs or pcLEDs. Individual LEDs or pcLEDs may have widths (e.g., side lengths) in the plane of the array of, for example, less than or equal to 1 millimeter (mm), less than or equal to 500 microns, less than or equal to 100 microns, less than or equal to 50 microns, or less than or equal to 10 microns. LEDs in such an array may be spaced apart from each other by streets or lanes having a width in the plane of the array of, for example, hundreds of microns, less than or equal to 100 microns, less than or equal to 50 microns, less than or equal to 10 microns, or less than or equal to 5 microns. Although the illustrated examples show rectangular LEDs or pcLEDs arranged in a symmetric matrix, the LEDs or pcLEDs and the array may have any suitable shape or arrangement and need not all be of the same shape or size. For example, LEDs or pcLEDs located in central portions of an array may be larger than those located in peripheral portions of the array. Alternatively, LEDs or pcLEDs located in central portions of an array may be smaller than those located in peripheral portions of the array.

Figure 2C:
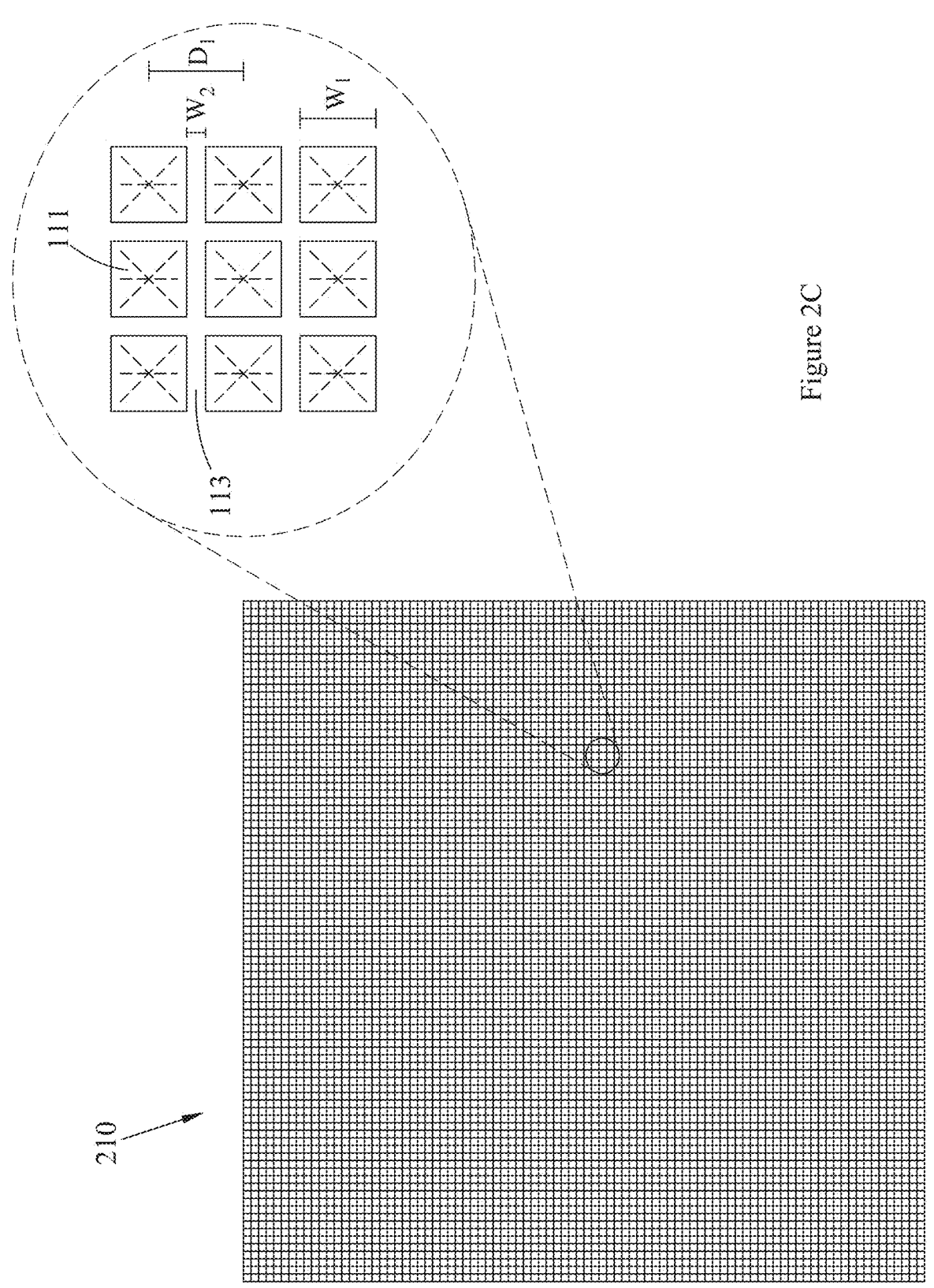
FIG. 2C shows a schematic top view of an LED wafer from which LED arrays such as those illustrated in FIGS. 2A and 2B may be formed.

FIG. 2C shows a schematic top view of a portion of an LED wafer 210 from which LED arrays such as those illustrated in FIGS. 2A and 2B may be formed. FIG. 2C also shows an enlarged 3×3 portion of the wafer. In the example wafer individual LEDs or pcLEDs 111 having side lengths (e.g., widths) of $W_1$ are arranged as a square matrix with neighboring LEDs or pcLEDs having a center-to-center distances $D_1$ and separated by lanes 113 having a width $W_2$. $W_1$ may be, for example, less than or equal to 5 millimeters (mm), less than or equal to 3 mm, less than or equal to 2 mm, less than or equal to 1 millimeter, less than or equal to 500 microns, less than or equal to 100 microns, less than or equal to 50 microns, or less than or equal to 10 microns. $W_2$ may be, for example, hundreds of microns, less than or equal to 100 microns, less than or equal to 50 microns, less than or equal to 10 microns, or less than or equal to 5 microns. $D_1=W_1+W_2$.

An array may be formed, for example, by dicing wafer 210 into individual LEDs or pcLEDs and arranging the dice on a substrate. Alternatively, an array may be formed from the entire wafer 210, or by dividing wafer 210 into smaller arrays of LEDs or pcLEDs.

LEDs or pcLEDs having dimensions in the plane of the array (e.g., side lengths) of less than or equal to about 50 microns are typically referred to as microLEDs, and an array of such microLEDs may be referred to as a microLED array.

In an array of pcLEDs, all pcLEDs may be configured to emit essentially the same spectrum of light. Alternatively, a pcLED array may be a multicolor array in which different pcLEDs in the array may be configured to emit different spectrums (colors) of light by employing different phosphor compositions. Similarly, in an array of direct emitting LEDs (i.e., not wavelength converted by phosphors) all LEDs in the array may be configured to emit essentially the same spectrum of light, or the array may be a multicolor array comprising LEDs configured to emit different colors of light.

The individual LEDs or pcLEDs in an array may be individually operable (addressable) and/or may be operable as part of a group or subset of (e.g., adjacent) LEDs or pcLEDs in the array.

An array of LEDs or pcLEDs, or portions of such an array, may be formed as a segmented monolithic structure in which individual LEDs or pcLEDs are electrically isolated or partially electrically isolated from each other by trenches and/or insulating material, but the electrically isolated or partially electrically isolated segments remain physically connected to each other by other portions of the semiconductor structure. For example, in such a monolithic structure the active region and a first semiconductor layer of a first conductivity type (n or p) on one side of the active region may be segmented, and a second unsegmented semiconductor layer of the opposite conductivity type (p or n) positioned on the opposite side of the active region from the first semiconductor layer. The second semiconductor layer may then physically and electrically connect the segmented structures to each other on one side of the active region, with the segmented structures otherwise electrically isolated from each other and thus separately operable as individual LEDs.

An LED or pcLED array may therefore be or comprise a monolithic multicolor matrix of individually operable LED or pcLED light emitters. The LEDs or pcLEDs in the monolithic array may for example be microLEDs as described above.

A single individually operable LED or pcLED or a group of adjacent such LEDs or pcLEDs may correspond to a single pixel (picture element) in a display. For example, a group of three individually operable adjacent LEDs or pcLEDs comprising a red emitter, a blue emitter, and a green emitter may correspond to a single color-tunable pixel in a display.

Figure 3A:
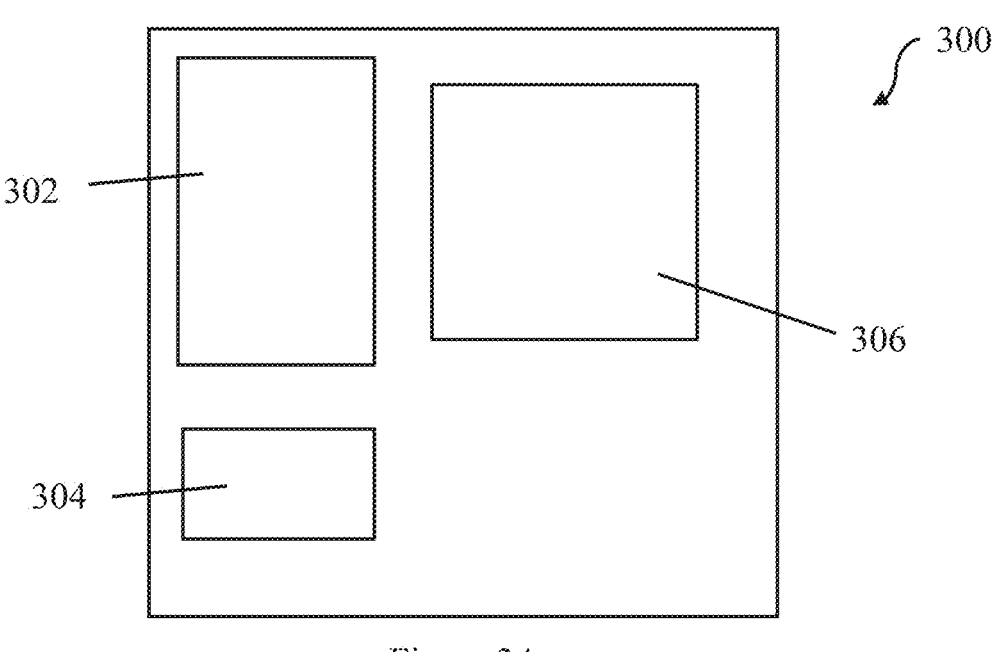
FIG. 3A shows a schematic top view of an electronics board on which an array of LEDs or pcLEDs may be mounted, and FIG. 3B similarly shows an array of pcLEDs mounted on the electronic board of FIG. 3A.
Figure 3B:
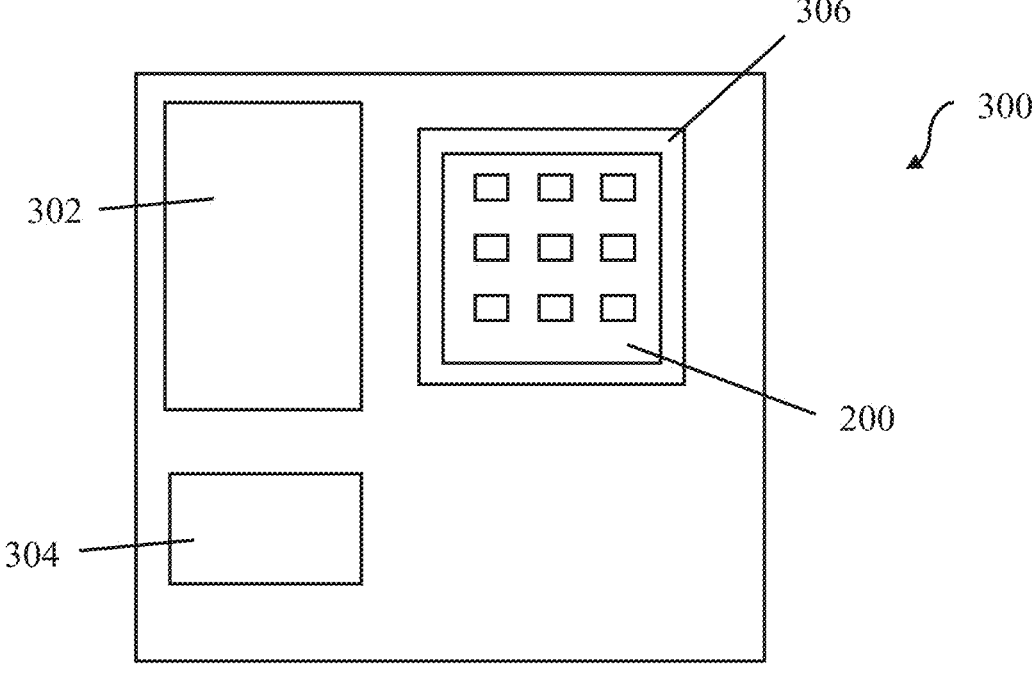

As shown in FIGS. 3A-3B, an LED or pcLED array 200 may for example be mounted on an electronics board 300 comprising a power and control module 302, a sensor module 304, and an attach region 306. Power and control module 302 may receive power and control signals from external sources and signals from sensor module 304, based on which power and control module 302 controls operation of the LEDs/pcLEDs. Sensor module 304 may receive signals from any suitable sensors, for example from temperature or light sensors. Alternatively, array 200 may be mounted on a separate board (not shown) from the power and control module and the sensor module.

Figure 4A:
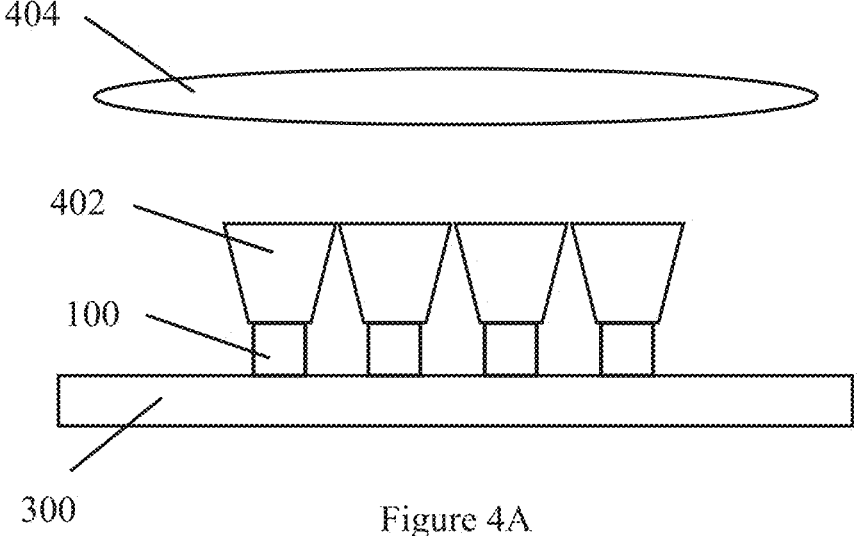
FIG. 4A shows a schematic cross-sectional view of an array of pcLEDs arranged with respect to waveguides and a projection lens.
Figure 4B:
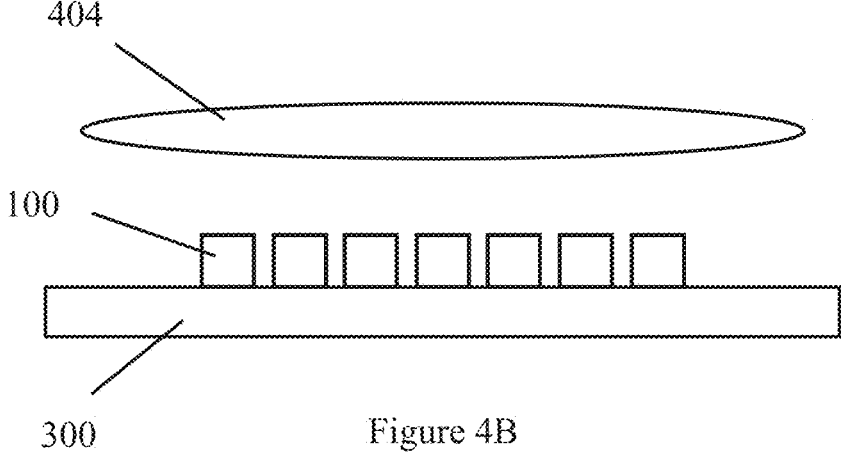
FIG. 4B shows an arrangement similar to that of FIG. 4A, without the waveguides.

Individual LEDs or pcLEDs may optionally incorporate or be arranged in combination with a lens or other optical element located adjacent to or disposed on the LED or the phosphor layer of the pcLED. Such an optical element, not shown in the figures, may be referred to as a "primary optical element". The microlens arrays disclosed in this specification may be employed as such primary optical elements. In addition, as shown in FIGS. 4A-4B an array 200 (for example, mounted on an electronics board 300) may be arranged in combination with secondary optical elements such as waveguides, lenses, or both for use in an intended application. In FIG. 4A, light emitted by pcLEDs 100 is collected by waveguides 402 and directed to projection lens 404. Projection lens 404 may be a Fresnel lens, for example. This arrangement may be suitable for use, for example, in automobile headlights. In FIG. 4B, light emitted by pcLEDs 100 is collected directly by projection lens 404 without use of intervening waveguides. This arrangement may be particularly suitable when LEDs or pcLEDs can be spaced sufficiently close to each other and may also be used in automobile headlights as well as in camera flash applications. A microLED display application may use similar optical arrangements to those depicted in FIGS. 4A-4B, for example.

In another example arrangement, a central block of LEDs or pcLEDs in an array may be associated with a single common (shared) optic, and edge LEDs or pcLEDs located in the array at the periphery of the central bloc are each associated with a corresponding individual optic.

Generally, any suitable arrangement of optical elements may be used in combination with the light emitting LED and pcLED apparatus described herein, depending on the desired application.

LED and pcLED arrays as described herein may be useful for applications requiring or benefiting from fine-grained intensity, spatial, and temporal control of light distributions. These applications may include, but are not limited to, precise special patterning of emitted light from individual LEDs or pcLEDs or from groups (e.g., blocks) of LEDs or pcLEDs. Depending on the application, emitted light may be spectrally distinct, adaptive over time, and/or environmentally responsive. Such arrays may provide pre-programmed light distribution in various intensity, spatial, or temporal patterns. The emitted light may be based at least in part on received sensor data and may be used for optical wireless communications. Associated electronics and optics may be distinct at an individual LED/pcLED, group, or device level.

An array of independently operable LEDs or pcLEDs may be used in combination with a lens, lens system, or other optic or optical system (e.g., as described above) to provide illumination that is adaptable for a particular purpose. For example, in operation such an adaptive lighting system may provide illumination that varies by color and/or intensity across an illuminated scene or object and/or is aimed in a desired direction. Beam focus or steering of light emitted by the LED or pcLED array can be performed electronically by activating LEDs or pcLEDs in groups of varying size or in sequence, to permit dynamic adjustment of the beam shape and/or direction without moving optics or changing the focus of the lens in the lighting apparatus. A controller can be configured to receive data indicating locations and color characteristics of objects or persons in a scene and based on that information control LEDs or pcLEDs in an array to provide illumination adapted to the scene. Such data can be provided for example by an image sensor, or optical (e.g., laser scanning) or non-optical (e.g., millimeter radar) sensors. Such adaptive illumination is increasingly important for automotive (e.g., adaptive headlights), mobile device camera (e.g., adaptive flash), AR, VR, and MR applications such as those described below.

Figure 5:
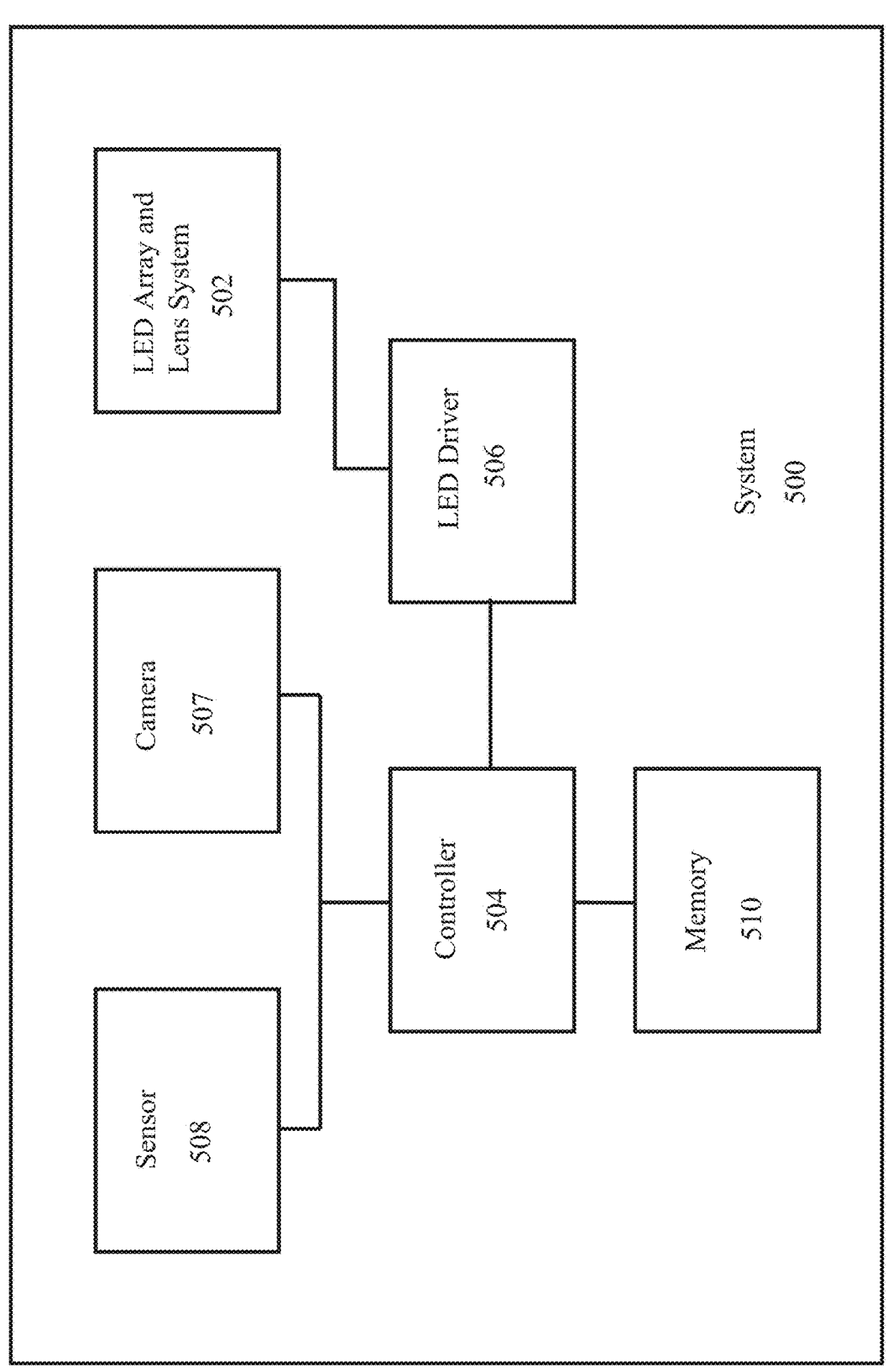
FIG. 5 schematically illustrates an example camera flash system.

FIG. 5 schematically illustrates an example camera flash system 500 comprising an LED or pcLED array and an optical (e.g., lens) system 502, which may be or comprise an adaptive lighting system as described above in which LEDs or pcLEDs in the array may be individually operable or operable as groups. System 502 may comprise an LED or pcLED array, a microlens array as described and employed herein in combination with the LED or pcLED array, and a secondary optic. In operation of the camera flash system, illumination from some or all of the LEDs or pcLEDs in array and optical system 502 may be adjusted—deactivated, operated at full intensity, or operated at an intermediate intensity. The array may be a monolithic array, or comprise one or more monolithic arrays, as described above. The array may be a microLED array, as described above.

Flash system 500 also comprises an LED driver 506 that is controlled by a controller 504, such as a microprocessor. Controller 504 may also be coupled to a camera 507 and to sensors 508 and operate in accordance with instructions and profiles stored in memory 510. Camera 507 and LED or pcLED array and lens system 502 may be controlled by controller 504 to, for example, match the illumination provided by system 502 (i.e., the field of view of the illumination system) to the field of view of camera 507, or to otherwise adapt the illumination provided by system 502 to the scene viewed by the camera as described above. Sensors 508 may include, for example, positional sensors (e.g., a gyroscope and/or accelerometer) and/or other sensors that may be used to determine the position and orientation of system 500.

Figure 6:
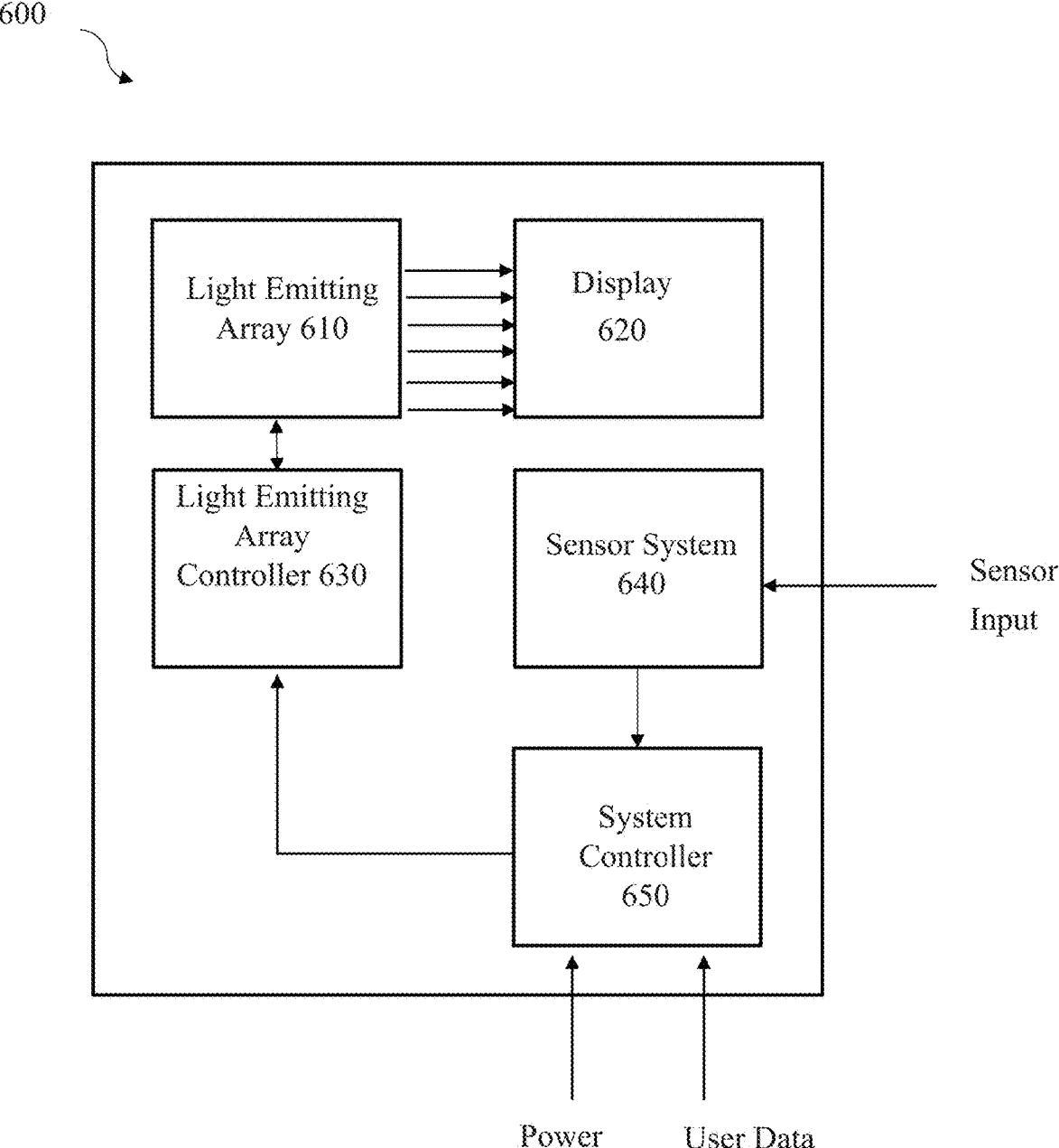
FIG. 6 schematically illustrates an example display system.

FIG. 6 schematically illustrates an example display system 600 that includes an array 610 of LEDs or pcLEDs that are individually operable or operable in groups, a display 620, a light emitting array controller 630, a sensor system 640, and a system controller 650. Array 610 may be a monolithic array, or comprise one or more monolithic arrays, as described above. The array may be monochromatic. Alternatively, the array may be a multicolor array in which different LEDs or pcLEDs in the array are configured to emit different colors of light, as described above. The array may therefore be or comprise a monolithic multicolor matrix of individually operable LED or pcLED light emitters, which may for example be microLEDs as described above. A single individually operable LED or pcLED or a group of adjacent such LEDs or pcLEDs in the array may correspond to a single pixel (picture element) in the display. For example, a group of three individually operable adjacent LEDs or pcLEDs comprising a red emitter, a blue emitter, and a green emitter may correspond to a single color-tunable pixel in the display. Similarly, to provide redundancy in the event of a defective LED or pcLED, a group of six individually operable adjacent LEDs or pcLEDs comprising two red emitters, two blue emitters, and two green emitters may correspond to a single color-tunable pixel in the display Array 610 can be used to project light in graphical or object patterns that can for example support AR/VR/MR systems.

Sensor input is provided to the sensor system 640, while power and user data input is provided to the system controller 650. In some embodiments modules included in system 600 can be compactly arranged in a single structure, or one or more elements can be separately mounted and connected via wireless or wired communication. For example, array 610, display 620, and sensor system 640 can be mounted on a headset or glasses, with the light emitting array controller and/or system controller 650 separately mounted.

System 600 can incorporate a wide range of optics (not shown) to couple light emitted by array 610 into display 620. Such optics may comprise, for example, a microlens array as disclosed and employed herein in combination with the LED or pcLED array. Any suitable optics may be used for this purpose.

Sensor system 640 can include, for example, external sensors such as cameras, depth sensors, or audio sensors that monitor the environment, and internal sensors such as accelerometers or two or three axis gyroscopes that monitor an AR/VR/MR headset position. Other sensors can include but are not limited to air pressure, stress sensors, temperature sensors, or any other suitable sensors needed for local or remote environmental monitoring. In some embodiments, control input through the sensor system can include detected touch or taps, gestural input, or control based on headset or display position.

In response to data from sensor system 640, system controller 650 can send images or instructions to the light emitting array controller 630. Changes or modification to the images or instructions can also be made by user data input, or automated data input as needed. User data input can include but is not limited to that provided by audio instructions, haptic feedback, eye or pupil positioning, or connected keyboard, mouse, or game controller.

As noted above, AR, VR, and MR systems may be more generally referred to as examples of visualization systems. In a virtual reality system, a display can present to a user a view of a scene, such as a three-dimensional scene. The user can move within the scene, such as by repositioning the user's head or by walking. The virtual reality system can detect the user's movement and alter the view of the scene to account for the movement. For example, as a user rotates the user's head, the system can present views of the scene that vary in view directions to match the user's gaze. In this manner, the virtual reality system can simulate a user's presence in the three-dimensional scene. Further, a virtual reality system can receive tactile sensory input, such as from wearable position sensors, and can optionally provide tactile feedback to the user.

In an augmented reality system, the display can incorporate elements from the user's surroundings into the view of the scene. For example, the augmented reality system can add textual captions and/or visual elements to a view of the user's surroundings. For example, a retailer can use an augmented reality system to show a user what a piece of furniture would look like in a room of the user's home, by incorporating a visualization of the piece of furniture over a captured image of the user's surroundings. As the user moves around the user's room, the visualization accounts for the user's motion and alters the visualization of the furniture in a manner consistent with the motion. For example, the augmented reality system can position a virtual chair in a room. The user can stand in the room on a front side of the virtual chair location to view the front side of the chair. The user can move in the room to an area behind the virtual chair location to view a back side of the chair. In this manner, the augmented reality system can add elements to a dynamic view of the user's surroundings.

Figure 7:
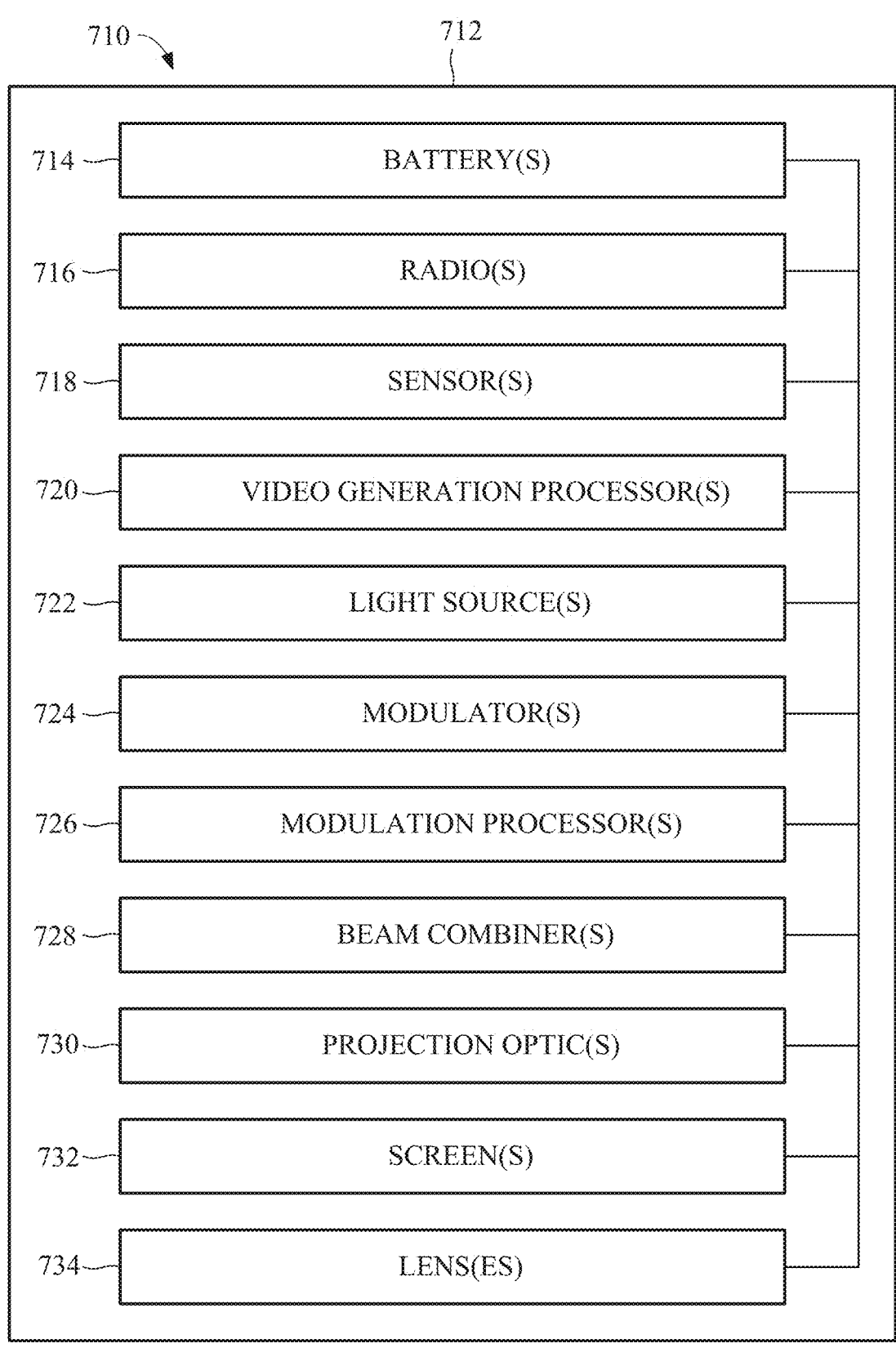
FIG. 7 shows a block diagram of an example visualization system.

FIG. 7 shows a generalized block diagram of an example visualization system 710. The visualization system 710 can include a wearable housing 712, such as a headset or goggles. The housing 712 can mechanically support and house the elements detailed below. In some examples, one or more of the elements detailed below can be included in one or more additional housings that can be separate from the wearable housing 712 and couplable to the wearable housing 712 wirelessly and/or via a wired connection. For example, a separate housing can reduce the weight of wearable goggles, such as by including batteries, radios, and other elements. The housing 712 can include one or more batteries 714, which can electrically power any or all of the elements detailed below. The housing 712 can include circuitry that can electrically couple to an external power supply, such as a wall outlet, to recharge the batteries 714. The housing 712 can include one or more radios 716 to communicate wirelessly with a server or network via a suitable protocol, such as WiFi.

The visualization system 710 can include one or more sensors 718, such as optical sensors, audio sensors, tactile sensors, thermal sensors, gyroscopic sensors, time-of-flight sensors, triangulation-based sensors, and others. In some examples, one or more of the sensors can sense a location, a position, and/or an orientation of a user. In some examples, one or more of the sensors 718 can produce a sensor signal in response to the sensed location, position, and/or orientation. The sensor signal can include sensor data that corresponds to a sensed location, position, and/or orientation. For example, the sensor data can include a depth map of the surroundings. In some examples, such as for an augmented reality system, one or more of the sensors 718 can capture a real-time video image of the surroundings proximate a user.

The visualization system 710 can include one or more video generation processors 720. The one or more video generation processors 720 can receive, from a server and/or a storage medium, scene data that represents a three-dimensional scene, such as a set of position coordinates for objects in the scene or a depth map of the scene. The one or more video generation processors 720 can receive one or more sensor signals from the one or more sensors 718. In response to the scene data, which represents the surroundings, and at least one sensor signal, which represents the location and/or orientation of the user with respect to the surroundings, the one or more video generation processors 720 can generate at least one video signal that corresponds to a view of the scene. In some examples, the one or more video generation processors 720 can generate two video signals, one for each eye of the user, that represent a view of the scene from a point of view of the left eye and the right eye of the user, respectively. In some examples, the one or more video generation processors 720 can generate more than two video signals and combine the video signals to provide one video signal for both eyes, two video signals for the two eyes, or other combinations.

The visualization system 710 can include one or more light sources 722 that can provide light for a display of the visualization system 710. Suitable light sources 722 can include any of the LEDs, pcLEDs, LED arrays, and pcLED arrays discussed above, for example those discussed above with respect to display system 600.

The visualization system 710 can include one or more modulators 724. The modulators 724 can be implemented in one of at least two configurations.

In a first configuration, the modulators 724 can include circuitry that can modulate the light sources 722 directly. For example, the light sources 722 can include an array of light-emitting diodes, and the modulators 724 can directly modulate the electrical power, electrical voltage, and/or electrical current directed to each light-emitting diode in the array to form modulated light. The modulation can be performed in an analog manner and/or a digital manner. In some examples, the light sources 722 can include an array of red light-emitting diodes, an array of green light-emitting diodes, and an array of blue light-emitting diodes, and the modulators 724 can directly modulate the red light-emitting diodes, the green light-emitting diodes, and the blue light-emitting diodes to form the modulated light to produce a specified image.

In a second configuration, the modulators 724 can include a modulation panel, such as a liquid crystal panel. The light sources 722 can produce uniform illumination, or nearly uniform illumination, to illuminate the modulation panel. The modulation panel can include pixels. Each pixel can selectively attenuate a respective portion of the modulation panel area in response to an electrical modulation signal to form the modulated light. In some examples, the modulators 724 can include multiple modulation panels that can modulate different colors of light. For example, the modulators 724 can include a red modulation panel that can attenuate red light from a red light source such as a red light-emitting diode, a green modulation panel that can attenuate green light from a green light source such as a green light-emitting diode, and a blue modulation panel that can attenuate blue light from a blue light source such as a blue light-emitting diode.

In some examples of the second configuration, the modulators 724 can receive uniform white light or nearly uniform white light from a white light source, such as a white-light light-emitting diode. The modulation panel can include wavelength-selective filters on each pixel of the modulation panel. The panel pixels can be arranged in groups (such as groups of three or four), where each group can form a pixel of a color image. For example, each group can include a panel pixel with a red color filter, a panel pixel with a green color filter, and a panel pixel with a blue color filter. Other suitable configurations can also be used.

The visualization system 710 can include one or more modulation processors 726, which can receive a video signal, such as from the one or more video generation processors 720, and, in response, can produce an electrical modulation signal. For configurations in which the modulators 724 directly modulate the light sources 722, the electrical modulation signal can drive the light sources 724.

For configurations in which the modulators 724 include a modulation panel, the electrical modulation signal can drive the modulation panel.

The visualization system 710 can include one or more beam combiners 728 (also known as beam splitters 728), which can combine light beams of different colors to form a single multi-color beam. For configurations in which the light sources 722 can include multiple light-emitting diodes of different colors, the visualization system 710 can include one or more wavelength-sensitive (e.g., dichroic) beam splitters 728 that can combine the light of different colors to form a single multi-color beam.

The visualization system 710 can direct the modulated light toward the eyes of the viewer in one of at least two configurations. In a first configuration, the visualization system 710 can function as a projector, and can include suitable projection optics 730 that can project the modulated light onto one or more screens 732. The screens 732 can be located a suitable distance from an eye of the user. The visualization system 710 can optionally include one or more lenses 734 that can locate a virtual image of a screen 732 at a suitable distance from the eye, such as a close-focus distance, such as 500 mm, 750 mm, or another suitable distance. In some examples, the visualization system 710 can include a single screen 732, such that the modulated light can be directed toward both eyes of the user. In some examples, the visualization system 710 can include two screens 732, such that the modulated light from each screen 732 can be directed toward a respective eye of the user. In some examples, the visualization system 710 can include more than two screens 732. In a second configuration, the visualization system 710 can direct the modulated light directly into one or both eyes of a viewer. For example, the projection optics 730 can form an image on a retina of an eye of the user, or an image on each retina of the two eyes of the user.

For some configurations of augmented reality systems, the visualization system 710 can include an at least partially transparent display, such that a user can view the user's surroundings through the display. For such configurations, the augmented reality system can produce modulated light that corresponds to the augmentation of the surroundings, rather than the surroundings itself. For example, in the example of a retailer showing a chair, the augmented reality system can direct modulated light, corresponding to the chair but not the rest of the room, toward a screen or toward an eye of a user.

Collimating or partially collimating the light extracted from an LED or pcLED light emitting (e.g., top) surface is desirable to get more directional output. This can improve illuminance for a field of view of 80° or 110°, for example, which is desirable for camera flash or illumination, and can improve the luminance which is desirable for example for automotive applications. A lens can collimate the light coming out of a point source. For an extended light emitting surface like that of an LED, an array of microlenses placed on top of the surface can be used. For the collimation to work well, a layer of lower index material (ideally air) needs to be placed between the lenses and the light emitting surface.

As summarized above, this specification discloses microlens arrays comprising a planar base, a plurality of microlenses arranged on the planar base, and a spacer protruding out of the plane of the base along peripheral portions of the base. Such a microlens array may be arranged in combination with one or more LEDs or pcLEDs with the spacer positioned between the microlens array and the LEDs or pcLEDs to space the microlenses away from the LED or pcLEDs. Arranged in this manner, the surface of the microlens array facing the LEDs or pcLEDs and light emitting surfaces of the LEDs or pcLEDs together define an air filled or evacuated gap between the microlens array and the LEDs or pcLEDs, which improves the performance of the microlens array in collimating or partially collimating light emitted by the LEDs or pcLEDs. The air filled or evacuated gap is built into the microlens array, in the sense that the gap is established by the protruding spacer portion of the microlens array.

Figure 8A:
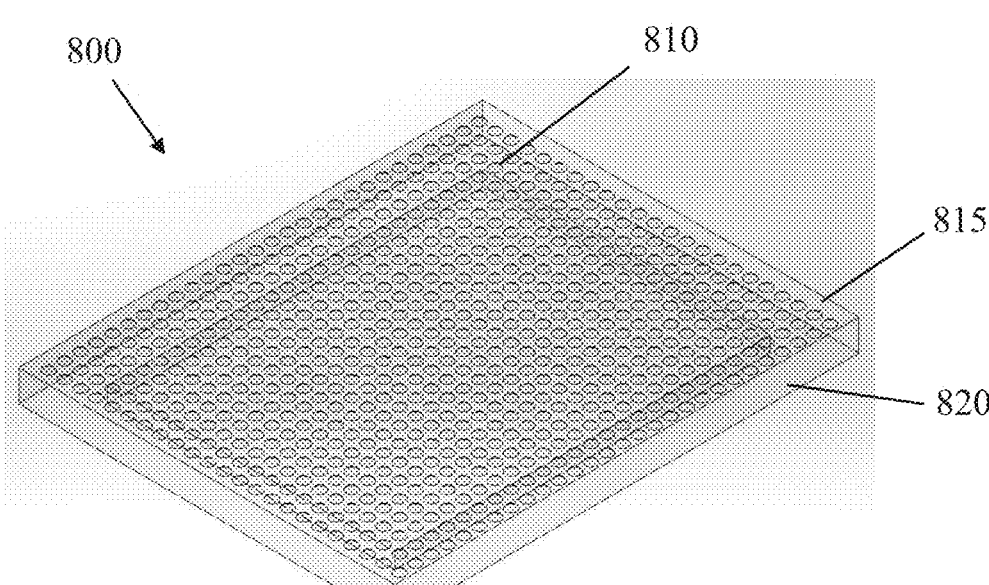
FIGS. 8A and 8B schematically illustrate, respectively, perspective and top views of an example microlens array.
Figure 8B:
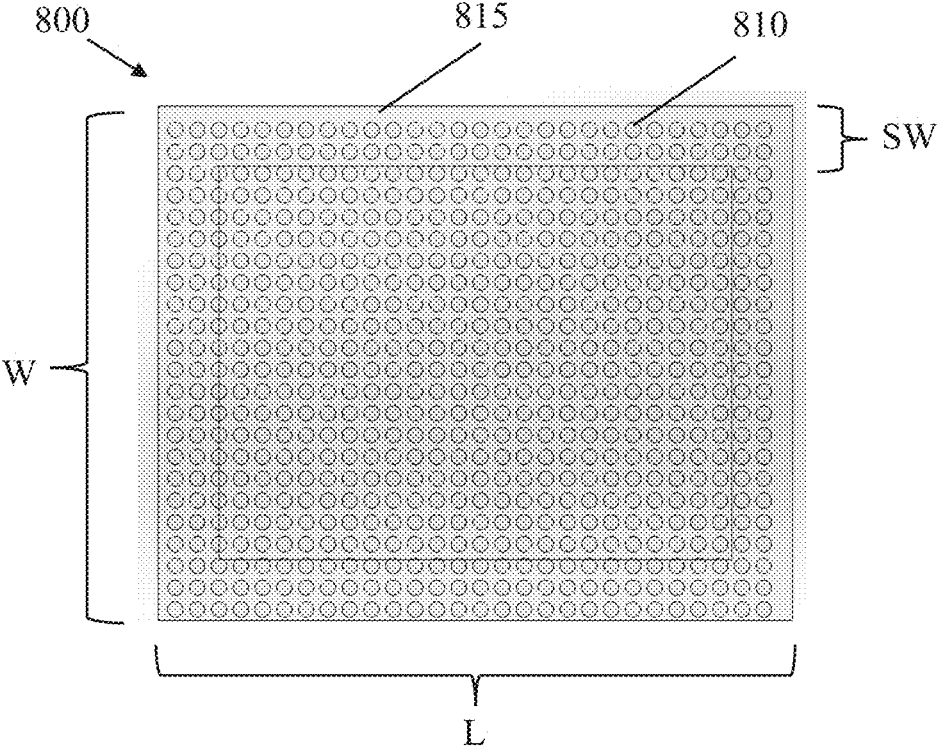
Figure 9:
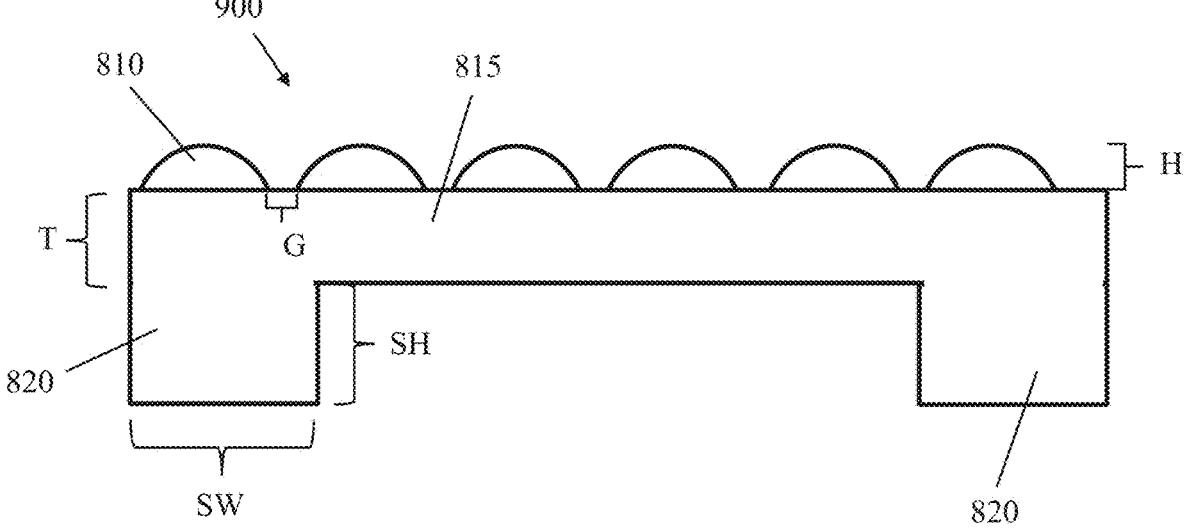
FIG. 9 shows a schematic cross-sectional view of an example microlens array.

FIG. 8A and FIG. 8B schematically illustrate, respectively, perspective and top views of an example microlens array 800. FIG. 9 shows a schematic cross-sectional view of a similar example microlens array 900 differing from that of FIG. 8A and FIG. 8B only in the number of microlenses shown.

Microlens arrays 800 and 900 comprise a plurality of microlenses 810 arranged on a flat base 815, and a spacer 820 protruding out of the plane of the base along peripheral portions of the base. The microlenses may have any suitable shape and curvature that performs as a lens, for example spherical or aspherical curvatures. Each microlens may have a radius of curvature of, for example, about 0.1 microns to about 100 microns, or about 0.1 microns to about 5 microns, or about 5 microns to about 100 microns. Referring again to FIGS. 8A, 8B, and 9, each microlens may have a height H of for example, about 0.1 microns to about 100 microns, or about 0.1 microns to about 5 microns, or about 5 microns to about 100 microns. (For hemispherical lenses the height equals the radius of curvature). The microlenses may be arranged, for example, in a rectangular or hexagonal lattice. The microlenses may be spaced apart from each other in the plane of the array or overlap/merge with neighbouring microlenses. The distance G between adjacent microlenses may be, for example, about −1 microns to about 50 microns, where a negative value means that adjacent microlenses overlap/merge with each other. A microlens array may comprise, for example, about 10 to about 20,000 microlenses depending on the size of the microlenses and the size of the LED, pcLED, or LED or pcLED array with which the microlens array is to be combined.

If of rectangular (e.g., square) shape as illustrated, the microlens array may have dimensions in the plane of the array of, for example, L=about 1 micron to about 3 mm and W=about 1 micron to about 3 mm. Any other suitable shape for the array may be used, with a longest dimension in the plane of the array having a range similar to that for L and W of a rectangular array.

The planar base of the array may have a thickness T of about 1 micron to about 100 microns, for example.

Spacer 820 may have a width SW of about 0.5 micron to about 350 microns, and a height SH of about 0.5 micron to about 100 microns. The thickness of the evacuated or air-filled gap formed between the microlens array and the one or more LEDs or pcLEDs will typically be the same, or approximately the same, as height SH of the spacer.

At the lower size limits given above, a microlens array may for example have L=W=about 1 micron, a base thickness T of about 1 micron, a spacer height SH of about 0.5 microns, and comprise microlenses having a radius of curvature of about 0.1 micron. Such a microlens array may be suitable for use, for example, with a single microLED of about 1 micron in size.

A microlens array as disclosed in this specification can significantly improve output metrics such as for example, illuminance, luminance, and radiation pattern. Illuminance may be improved by 30% to 40% or more, for example, compared to performance without the microlens array. The shape, radius of curvature, and height of the microlenses, the thickness of the base, and the height of the spacer (thickness of the gap) may be optimized for specific device and target output metrics.

In one example, microlens array parameters were optimized via design of experiment (DOE) simulations for a camera flash application, where it is desirable to improve the illuminance while keeping a smooth fall-off towards the edges, and corner illuminance ~35% of the peak or above. For a base thickness T of 50 microns, a spacer width SW of 282 microns, and a spacer height (air gap thickness) SH of 100 microns, the optimized radius and height of the bumps are about 40 microns and about 22.3 microns, respectively.

The illustrated examples show microlenses 810 located on the front surface of planar base 815, facing away from the one or more LEDs or pcLEDs. Alternatively, or additionally, microlenses 810 may be located on the rear surface of planar base 815 facing toward the one or more LEDs or pcLEDs.

The illustrated examples show protruding spacer 820 as extending continuously around the perimeter of base 815 and thus enclosing the gap region. Alternatively, spacer 820 may extend in a discontinuous manner around the perimeter of base 815, e.g., comprise openings in an otherwise continuous structure.

FIGS. 10A, 10B, 10C, and 10D show schematic cross-sectional views of example light emitting apparatus each comprising a microlens array 1000 spaced apart from a wavelength converted LED, which is disposed on a substrate 104. Microlens array 1000 is similar or identical to microlens arrays 800 and 900 described above. The wavelength converted LED comprises a wavelength converting structure 1005 disposed on an LED 1010. The light emitting apparatus also comprise optically isolating side coats (OSC) 1015 disposed adjacent the wavelength converted LED. The OSC may comprise, for example, light scattering and/or light absorbing particles disposed in binder material.

Figure 10A:
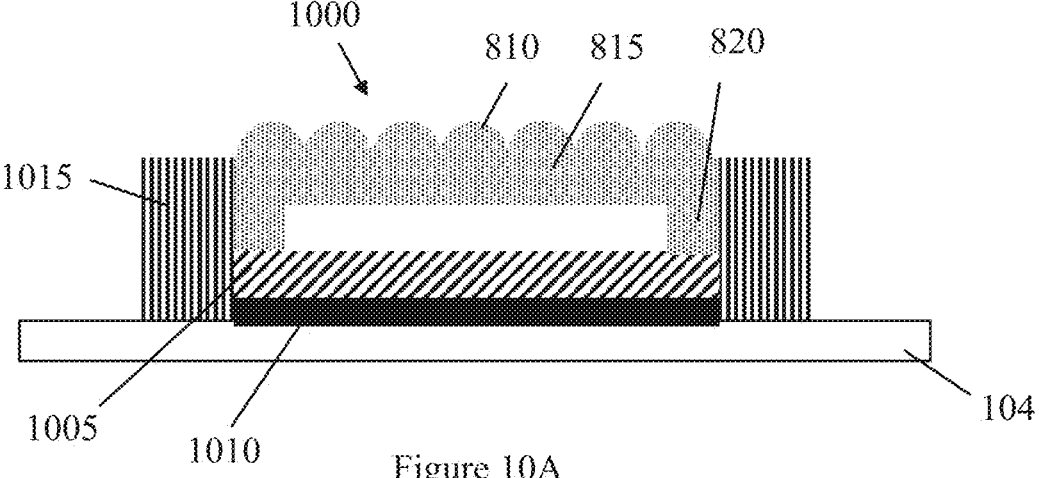
FIGS. 10A, 10B, 10C, and 10D show schematic cross-sectional views of example light emitting apparatus each comprising a microlens array spaced apart from a wavelength converted LED.
Figure 10B:
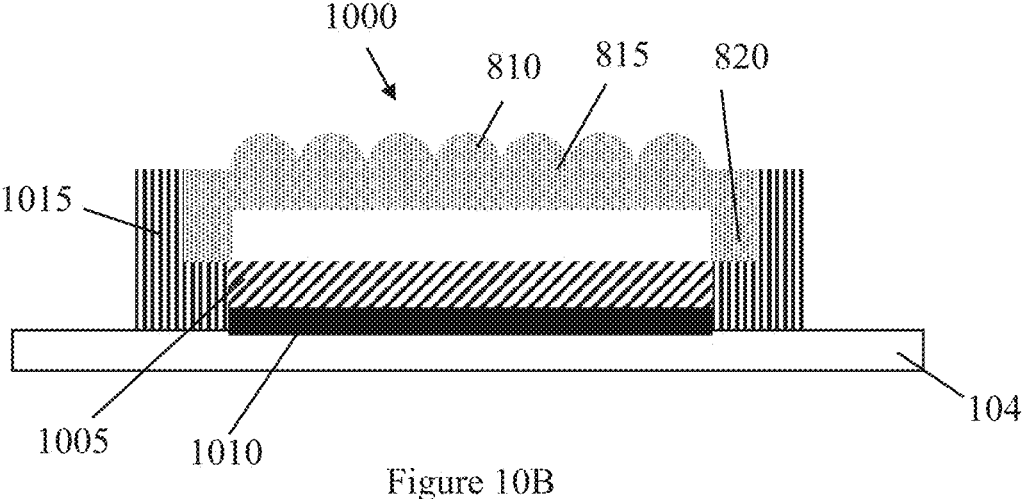
Figure 10C:
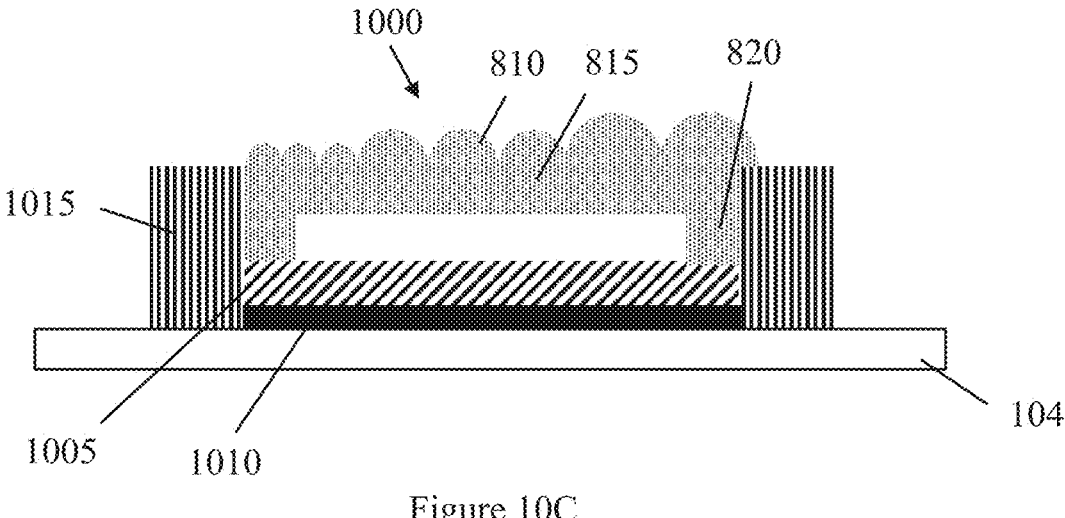

In the examples of FIG. 10A and FIG. 10C, the microlens array is spaced apart from the light emitting surface of the wavelength converting structure 1005 by spacer 820 extending from peripheral portions of base 815 to peripheral portions of the light emitting surface of the wavelength converting structure 1005. Spacer 820 may be attached to wavelength converting structure 1005 with transparent glue, for example.

Figure 10D:
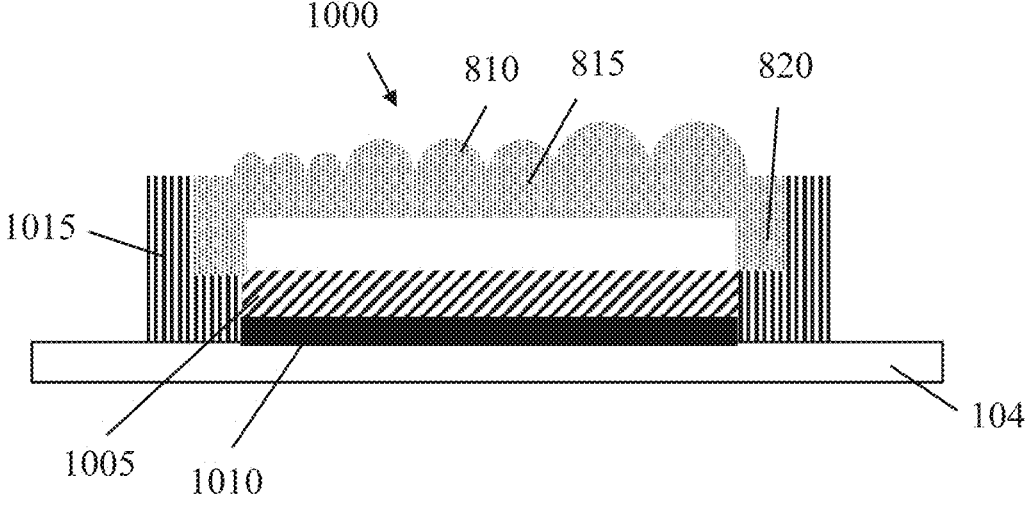

In the examples of FIG. 10B and FIG. 10D, the microlens array is spaced apart from the light emitting surface of the wavelength converting structure 1005 by spacer 820 extending from peripheral portions of base 815 to a surface of OSC 1015. Spacer 820 may be attached to the surface of OSC 1015 with a transparent glue, for example.

In the examples of FIG. 10A and FIG. 10B, all microlenses 810 have the same radius of curvature. In the examples of FIG. 10C and FIG. 10D, the radii of curvature of microlenses 810 depend on their location in the microlens array.

FIGS. 11A, 11B, 11C, and 11D show schematic cross-sectional views of example light emitting apparatus each comprising a microlens array 1000 spaced apart from an array of wavelength converted LEDs. In the illustrated example, the array of wavelength converted LEDs comprises a plurality of LEDs 1010 sharing a wavelength converting structure 1005. Alternatively, the wavelength converting structure may be segmented into separate portions each disposed on an LED to form a wavelength converted LED in the array. Apart from comprising an array of wavelength converting LEDs rather than a single wavelength converted LED, the light emitting apparatus of FIGS. 11A-11D are similar to those of FIGS. 10A-10D.

Figure 11A:
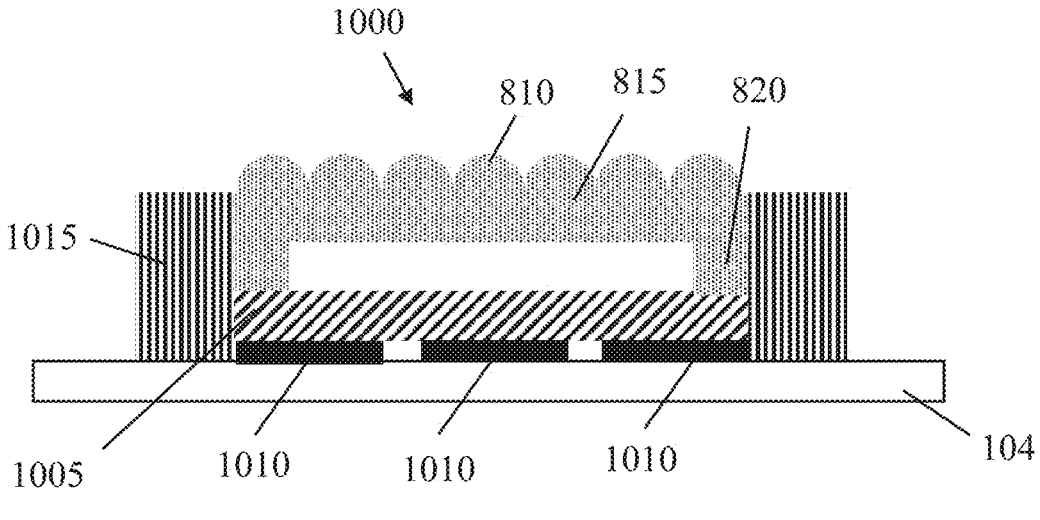
FIGS. 11A, 11B, 11C, and 11D show schematic cross-sectional views of example light emitting apparatus each comprising a microlens array spaced apart from an array of wavelength converted LEDs.
Figure 11B:
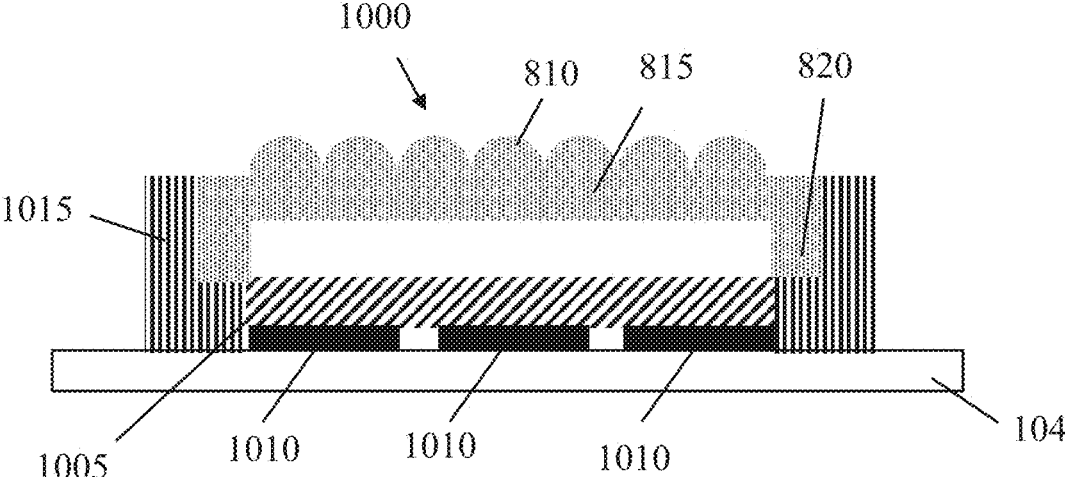
Figure 11C:
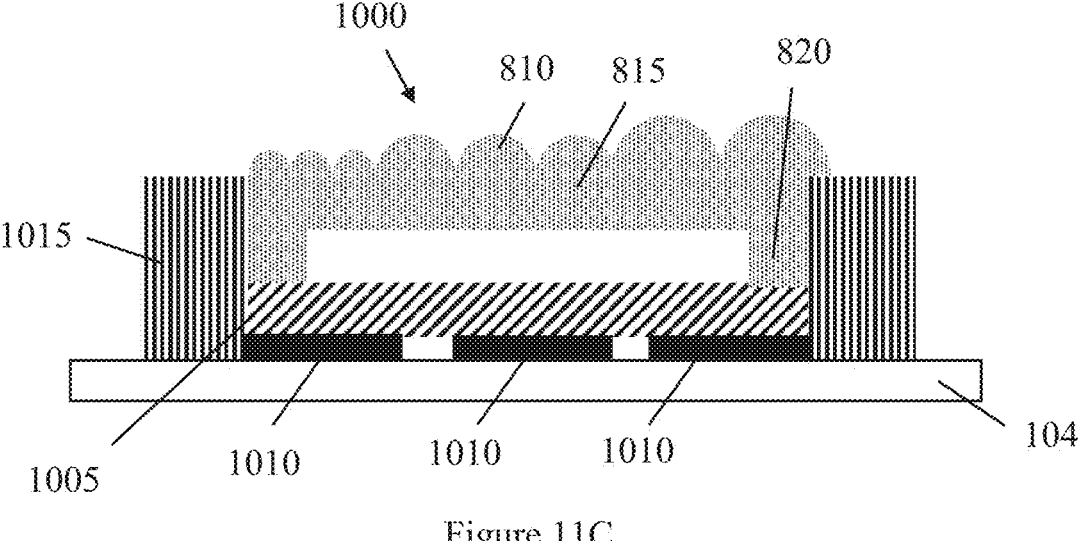

In the examples of FIG. 11A and FIG. 11C, the microlens array is spaced apart from the light emitting surface of the wavelength converting structure 1005 by spacer 820 extending from peripheral portions of base 815 to peripheral portions of the light emitting surface of the wavelength converting structure 1005. Spacer 820 may be attached to wavelength converting structure 1005 with transparent glue, for example.

Figure 11D:
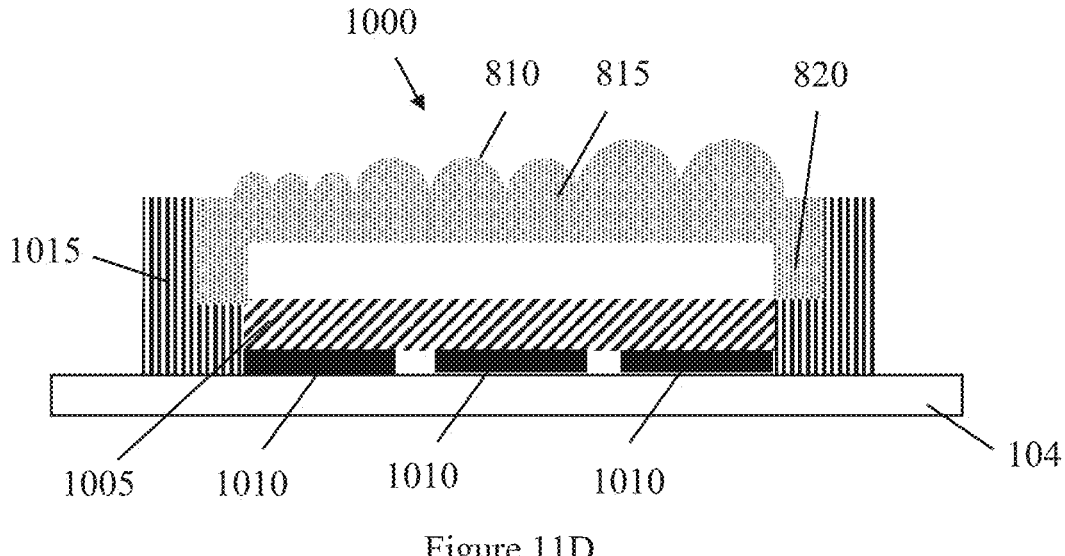

In the examples of FIG. 11B and FIG. 11D, the microlens array is spaced apart from the light emitting surface of the wavelength converting structure 1005 by spacer 820 extending from peripheral portions of base 815 to a surface of OSC 1015. Spacer 820 may be attached to the surface of OSC 1015 with a transparent glue, for example.

In the examples of FIG. 11A and FIG. 11B, all microlenses 810 have the same radius of curvature. In the examples of FIG. 11C and FIG. 11D, the radii of curvature of microlenses 810 depend on their location in the microlens array.

FIGS. 12A, 12B, 12C, and 12D show schematic cross-sectional views of example light emitting apparatus each comprising a microlens array 1000 spaced apart from a direct emitting (not wavelength converted) LED 1010. Apart from comprising a direct emitting LED rather than a wavelength converted LED, the light emitting apparatus of FIGS. 12A-12D are similar to those of FIGS. 10A-10D.

Figure 12A:
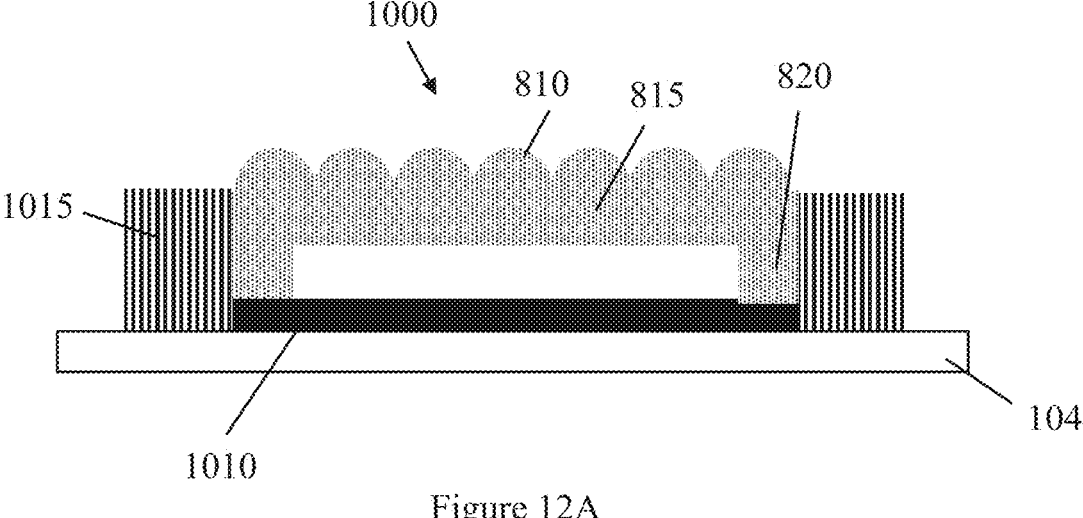
FIGS. 12A, 12B, 12C, and 12D show schematic cross-sectional views of example light emitting apparatus each comprising a microlens array spaced apart from a direct emitting (not wavelength converted) LED.
Figure 12B:
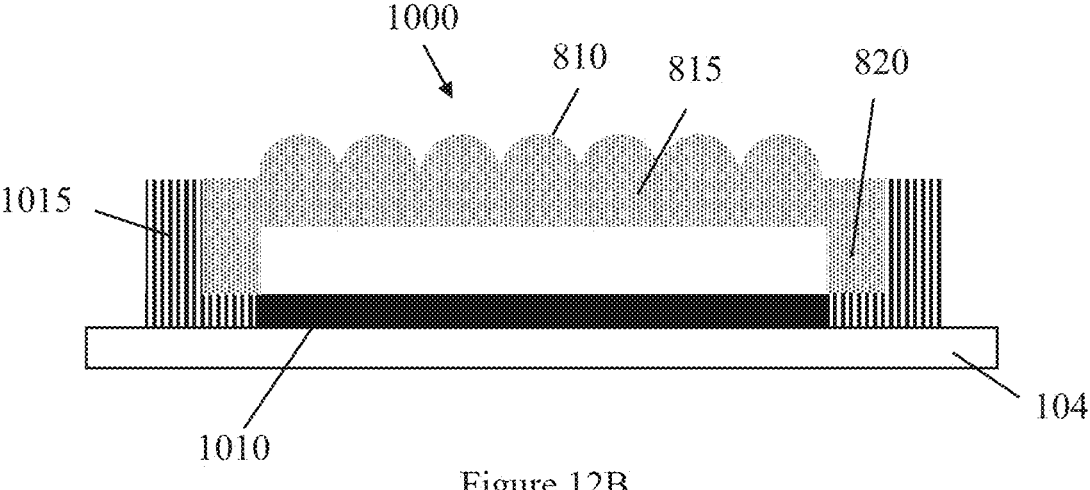
Figure 12C:
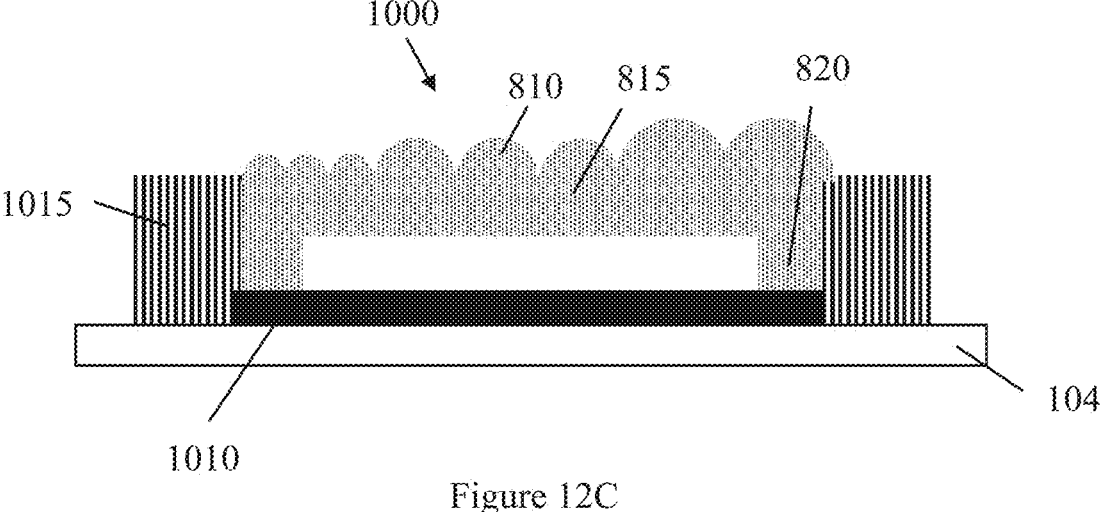

In the examples of FIG. 12A and FIG. 12C, the microlens array is spaced apart from the light emitting surface of LED 1010 by spacer 820 extending from peripheral portions of base 815 to peripheral portions of the light emitting surface of LED 1010. Spacer 820 may be attached to the light emitting surface of LED 1010 with transparent glue, for example.

Figure 12D:
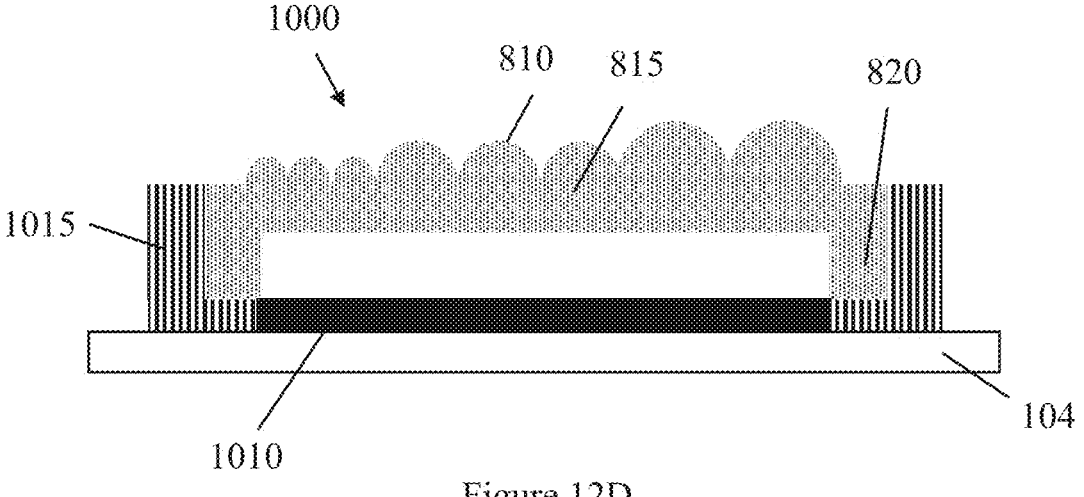

In the examples of FIG. 12B and FIG. 12D, the microlens array is spaced apart from the light emitting surface of LED 1010 by spacer 820 extending from peripheral portions of base 815 to a surface of OSC 1015. Spacer 820 may be attached to the surface of OSC 1015 with a transparent glue, for example.

In the examples of FIG. 12A and FIG. 12B, all microlenses 810 have the same radius of curvature. In the examples of FIG. 12C and FIG. 12D, the radii of curvature of microlenses 810 depend on their location in the microlens array.

FIGS. 13A, 13B, 13C, and 13D show schematic cross-sectional views of example light emitting apparatus each comprising a microlens array spaced apart from an array of direct emitting LEDs. Apart from comprising an array of direct emitting LEDs rather than a single direct emitting LED, the light emitting apparatus of FIGS. 13A-13D are similar to those of FIGS. 12A-12D.

Figures 13A, 13B:
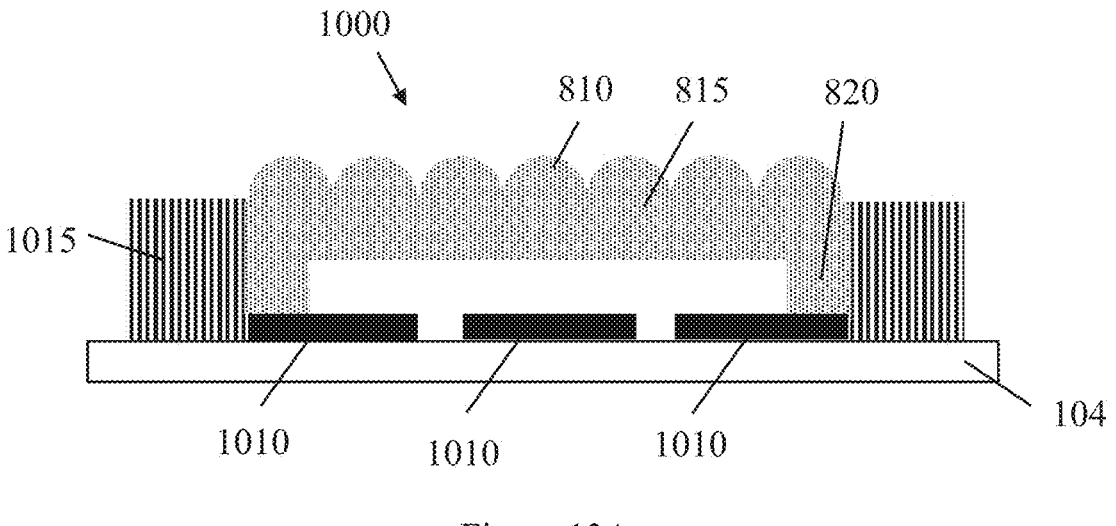
FIGS. 13A, 13B, 13C, and 13D show schematic cross-sectional views of example light emitting apparatus each comprising a microlens array spaced apart from an array of direct emitting LEDs.
Figure 13C:
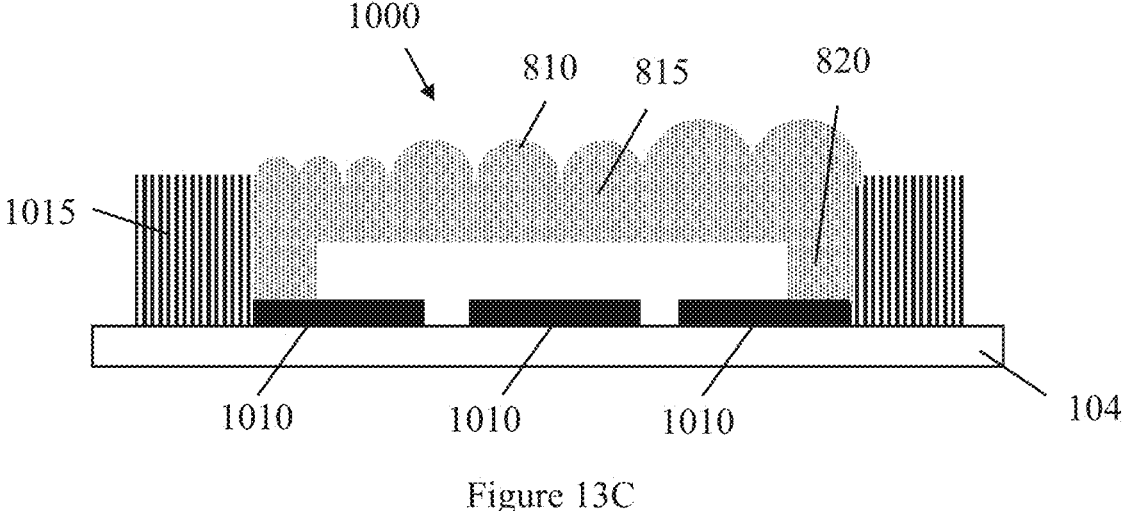

In the examples of FIG. 13A and FIG. 13C, the microlens array is spaced apart from the light emitting surfaces of LEDs 1010 by spacer 820 extending from peripheral portions of base 815 to peripheral portions of the light emitting surfaces of LEDs 1010 located in peripheral regions of the LED array. Spacer 820 may be attached to the light emitting surfaces of LEDs 1010 with transparent glue, for example.

Figure 13D:
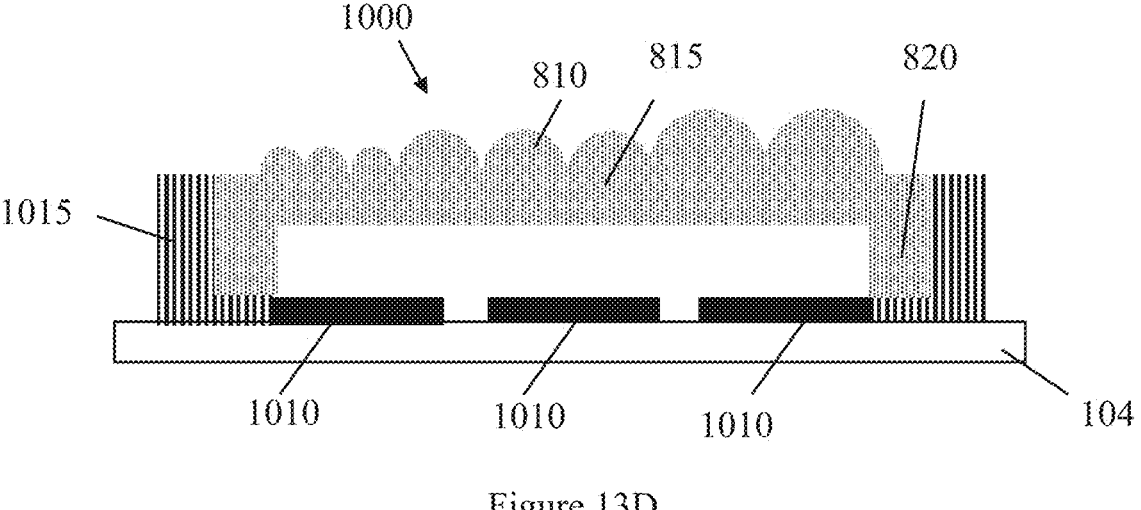

In the examples of FIG. 13B and FIG. 13D, the microlens array is spaced apart from the light emitting surfaces of LEDs 1010 by spacer 820 extending from peripheral portions of base 815 to a surface of OSC 1015. Spacer 820 may be attached to the surface of OSC 1015 with a transparent glue, for example.

In the examples of FIG. 13A and FIG. 13B, all microlenses 810 have the same radius of curvature. In the examples of FIG. 13C and FIG. 13D, the radii of curvature of microlenses 810 depend on their location in the microlens array.

Figure 14:
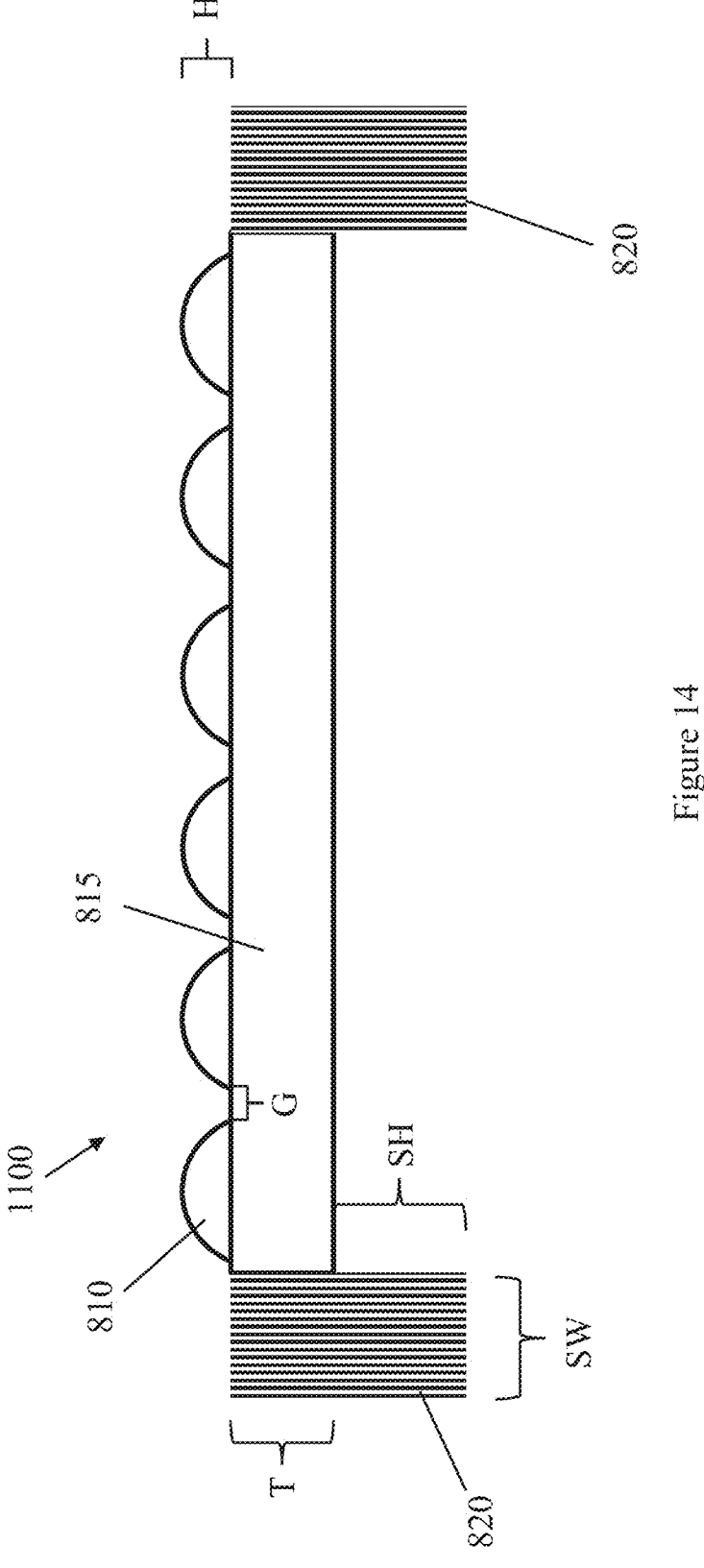
FIG. 14 shows a schematic cross-sectional view of another example microlens array.

FIG. 14 shows a schematic cross-sectional view of another example microlens array 1100 similar to microlens array 900 shown in FIG. 9. In microlens array 1100, spacer 820 comprises an optically isolating material such as for example light scattering and/or light absorbing particles disposed in a binder material. In this variation spacer 820 also functions as an optical isolation structure, which may take the place of optical side coats 1015 described above. Because spacer 820 in this variation is light scattering or light absorbing, it is positioned peripherally to the microlenses so as not to obstruct the path of light from an LED or pcLED to any of the microlenses. Microlens array 1100 may otherwise be similar or identical to the microlens arrays described above.

The microlenses, base, and spacer of microlens array 1100 may, for example, be formed as a single integral structure from a transparent material such as, for example, glass or silicone, with the spacer portion of the microlens array comprising optically isolating material dispersed in the otherwise transparent material, which acts as a binder for the optically isolating material.

Figure 15A:
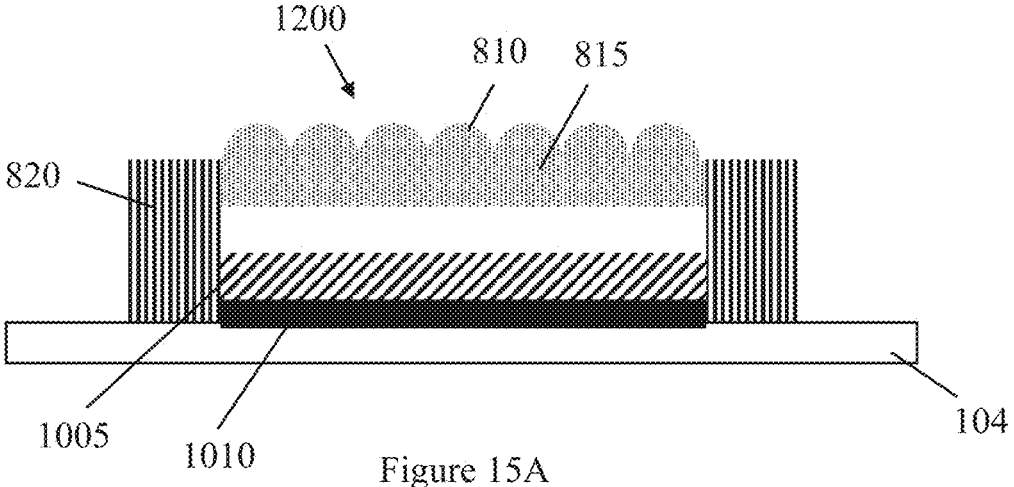
FIGS. 15A and 15B show schematic cross-sectional views of example light emitting apparatus each comprising a microlens array spaced apart from a wavelength converted LED.
Figure 15B:
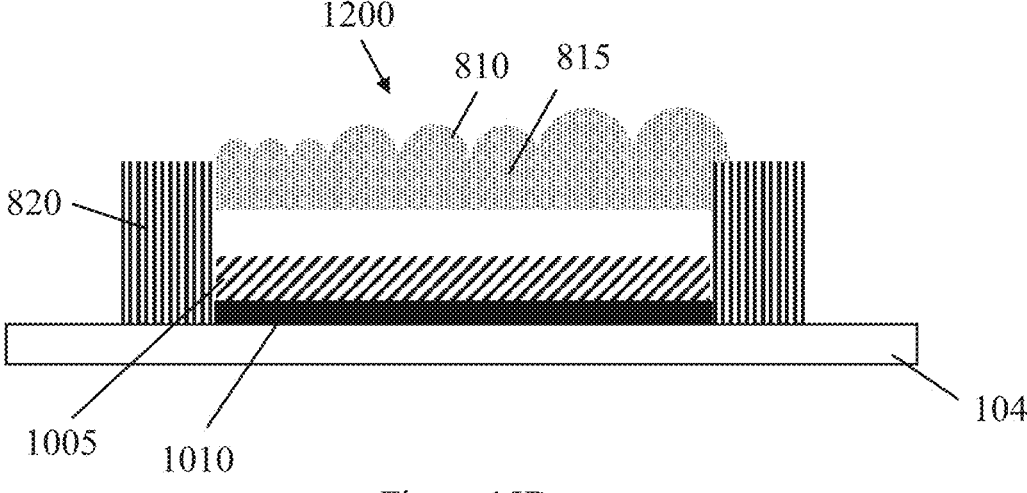

FIGS. 15A and 15B show schematic cross-sectional views of example light emitting apparatus each comprising a microlens array 1200 spaced apart from a wavelength converted LED, which is disposed on a substrate 104. Microlens array 1200 is similar or identical to microlens array 1100 described above. The wavelength converted LED comprises a wavelength converting structure 1005 disposed on an LED 1010. The microlens array is spaced apart from the light emitting surface of the wavelength converting structure 1005 by spacer 820 extending from peripheral portions of base 815 to substrate 104. Spacer 820 may be attached to substrate 104 with glue, for example.

In the example of FIG. 15A all microlenses 810 have the same radius of curvature. In the example of FIG. 15B the radii of curvature of microlenses 810 depend on their location in the microlens array.

Figure 16A:
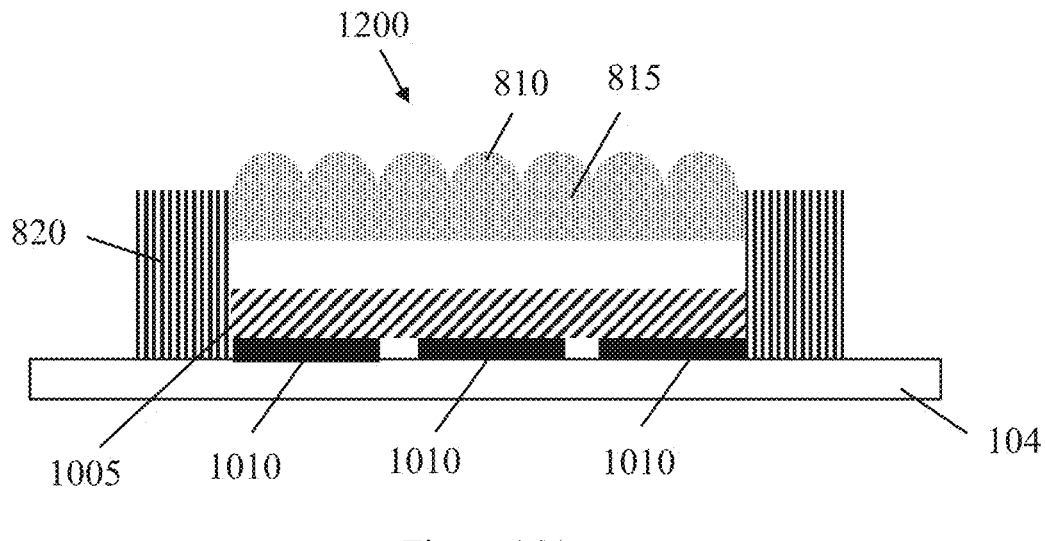
FIGS. 16A and 16B show schematic cross-sectional views of example light emitting apparatus each comprising a microlens array spaced apart from an array of wavelength converted LEDs.
Figure 16B:
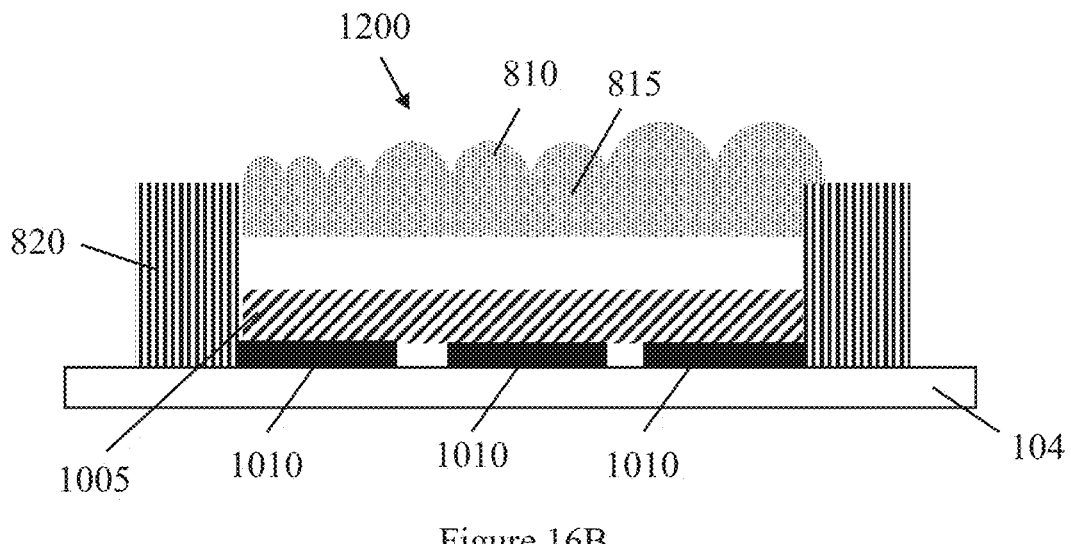

FIGS. 16A and 16B show schematic cross-sectional views of example light emitting apparatus each comprising a microlens array 1200 spaced apart from an array of wavelength converted LEDs. In the illustrated examples, the array of wavelength converted LEDs comprises a plurality of LEDs 1010 sharing a wavelength converting structure 1005. Alternatively, the wavelength converting structure may be segmented into separate portions each disposed on an LED to form a wavelength converted LED in the array. Apart from comprising an array of wavelength converting LEDs rather than a single wavelength converted LED, the light emitting apparatus of FIGS. 16A-16B are similar to those of FIGS. 15A-15B.

In the example of FIG. 16A all microlenses 810 have the same radius of curvature. In the example of FIG. 16B the radii of curvature of microlenses 810 depend on their location in the microlens array.

Figure 17A:
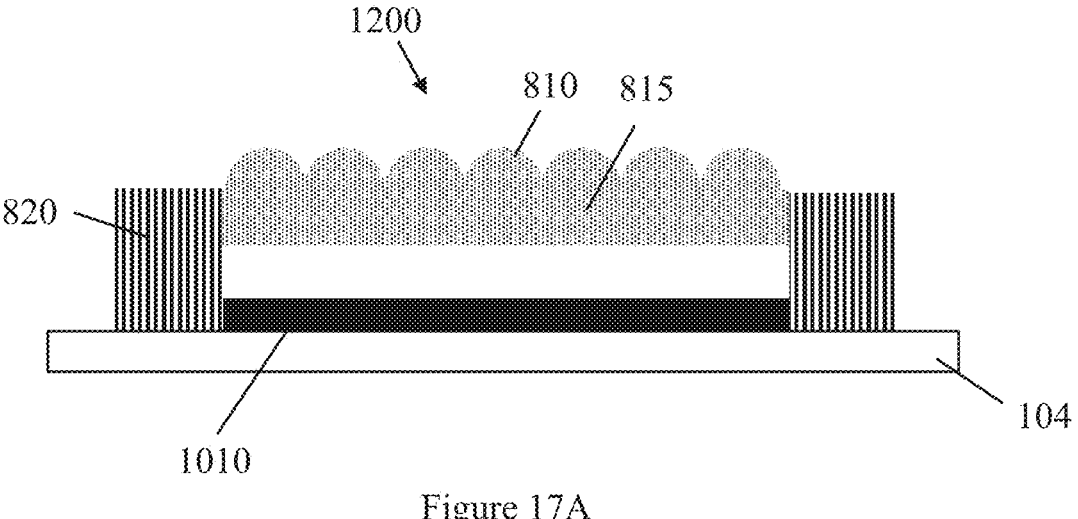
FIGS. 17A and 17B show schematic cross-sectional views of example light emitting apparatus each comprising a microlens array spaced apart from a direct emitting (not wavelength converted) LED.
Figure 17B:
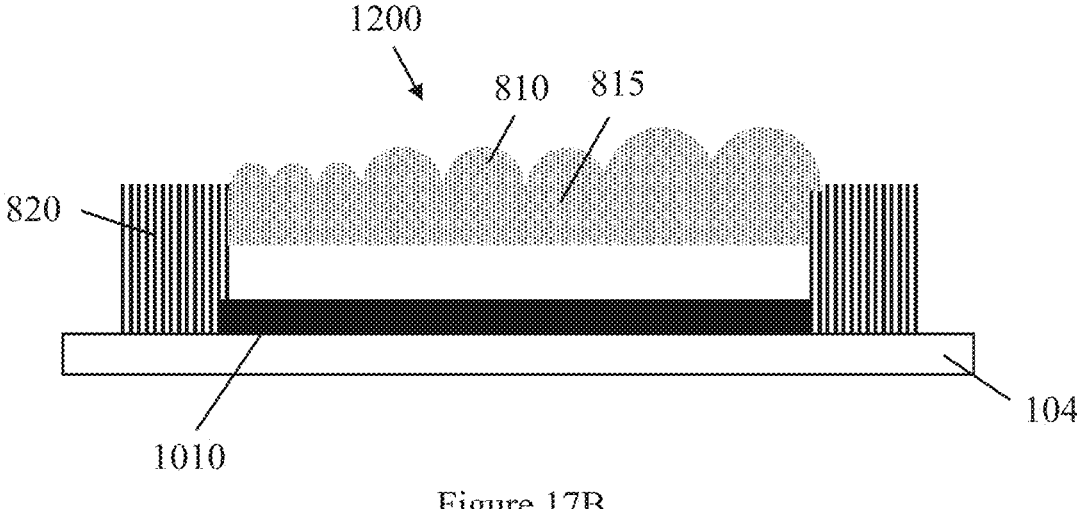

FIGS. 17A and 17B show schematic cross-sectional views of example light emitting apparatus each comprising a microlens array 1200 spaced apart from a direct emitting (not wavelength converted) LED 1010. Apart from comprising a direct emitting LED rather than a wavelength converted LED, the light emitting apparatus of FIGS. 17A-17B are similar to those of FIGS. 15A-15B.

In the example of FIG. 17A all microlenses 810 have the same radius of curvature. In the example of FIG. 17B the radii of curvature of microlenses 810 depend on their location in the microlens array.

Figure 18A:
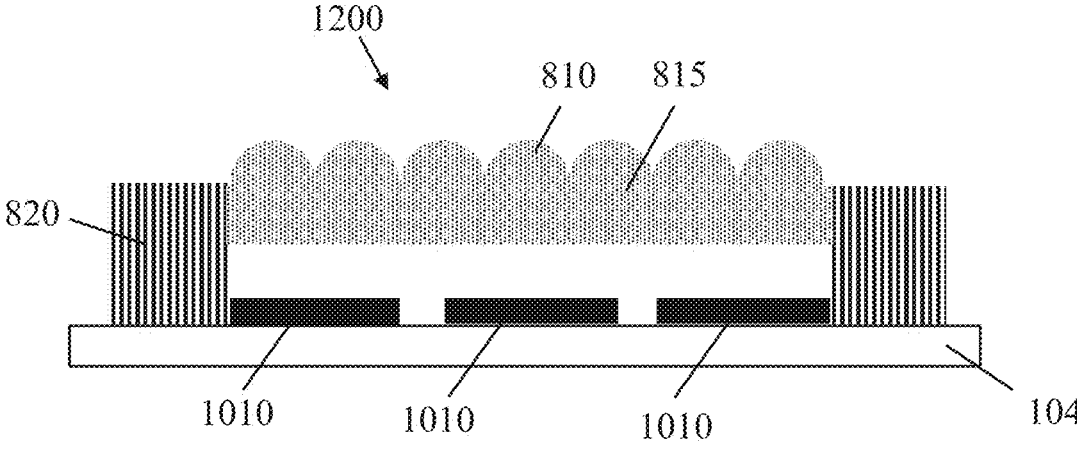
FIGS. 18A and 18B show schematic cross-sectional views of example light emitting apparatus each comprising a microlens array spaced apart from an array of direct emitting LEDs.
Figure 18B:
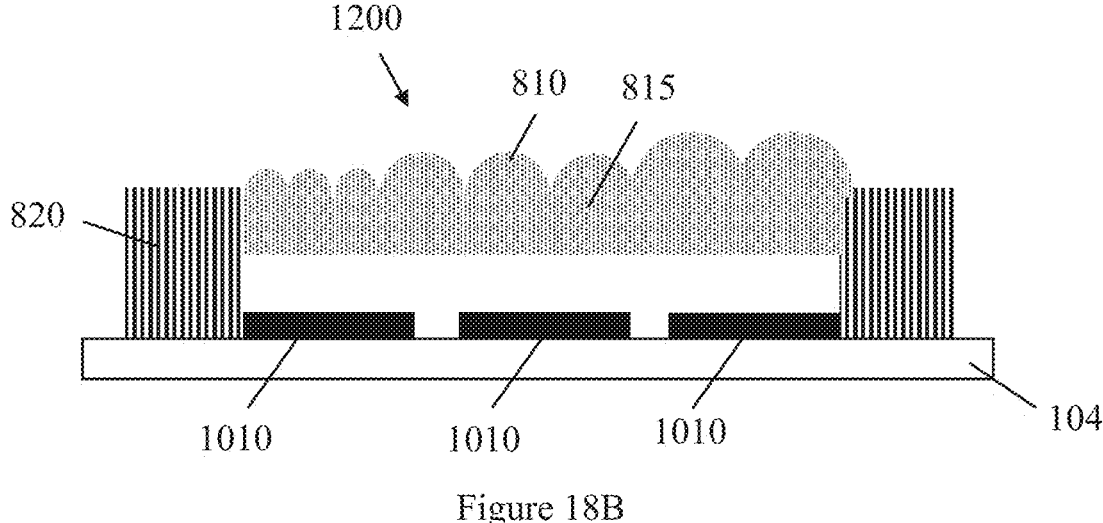

FIGS. 18A and 18B show schematic cross-sectional views of example light emitting apparatus each comprising a microlens array spaced apart from an array of direct emitting LEDs. Apart from comprising an array of direct emitting LEDs rather than a single direct emitting LED, the light emitting apparatus of FIGS. 18A-18B are similar to those of FIGS. 17A-17B.

In the example of FIG. 18A all microlenses 810 have the same radius of curvature. In the examples of FIG. 18B the radii of curvature of microlenses 810 depend on their location in the microlens array.

FIGS. 19A-19F and 20A-20F show schematic cross-sectional views of example light emitting apparatus similar to those described above with respect to FIGS. 16A-16B and 18A-18B, for example, further comprising a plurality of optical isolation barriers 1310 disposed in the base of the microlens array. The optical isolation barriers comprise an optically isolating material such as for example light scattering and/or light absorbing particles disposed in a binder material.

The optical isolation barriers 1310 are arranged parallel to and overlying the streets (gaps between adjacent LEDs) in the array of light emitting diodes, and at least partially optically isolate adjacent LEDs or pcLEDs from each other. Optical isolation barriers 1310 may be arranged in a grid pattern for example, with optical isolation barriers arranged to surround the peripheries of the LEDs or pcLEDs in the array. In the case of optical isolation barriers arranged in a grid pattern, schematic cross-sectional views of the example light emitting apparatus taken perpendicular to the views shown in the figures may be similar or identical to the views shown in the figures.

Optical isolation barriers 1310 may, for example, extend entirely across the air gap to the wavelength converter 1005 or the light emitting diodes 1010 (FIGS. 19A-19B and 20A-20B), be disposed entirely within the base 815 of the microlens array (FIGS. 19C-19D and 20C-20D), or extend partially into but not entirely across the air gap (FIGS. 19E-19F and 20E-20F).

Figure 19A:
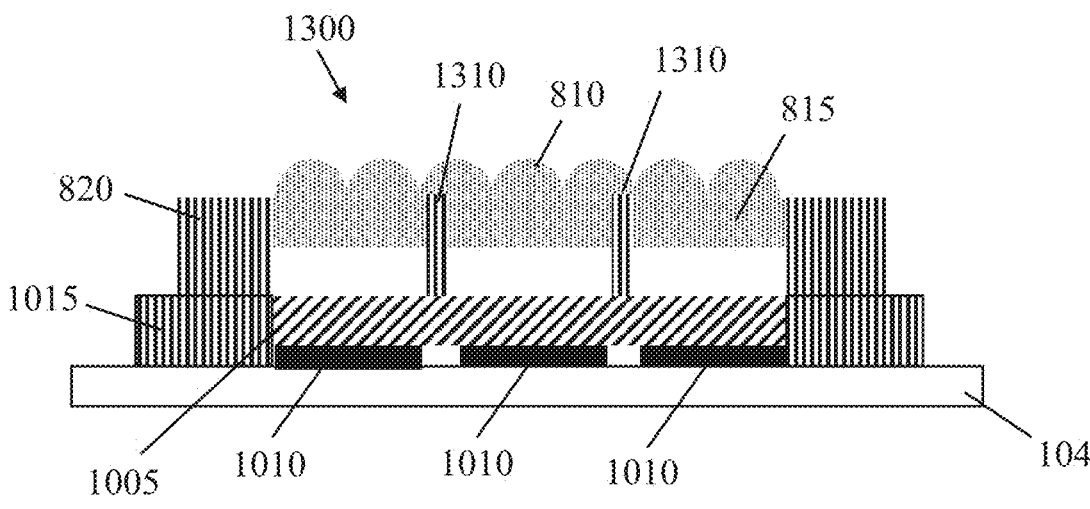
FIGS. 19A, 19B, 19C, 19D, 19E, and 19F show schematic cross-sectional views of example light emitting apparatus each comprising a microlens array spaced apart from an array of wavelength converted LEDs and a plurality of optical isolation barriers disposed in the base of the microlens array.
Figure 19B:
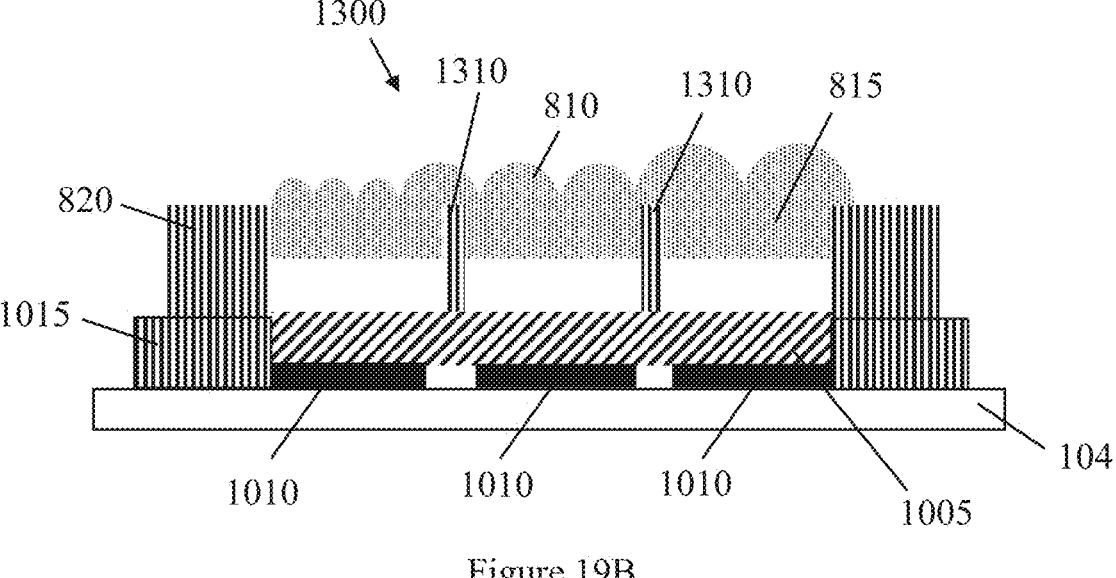
Figure 19C:
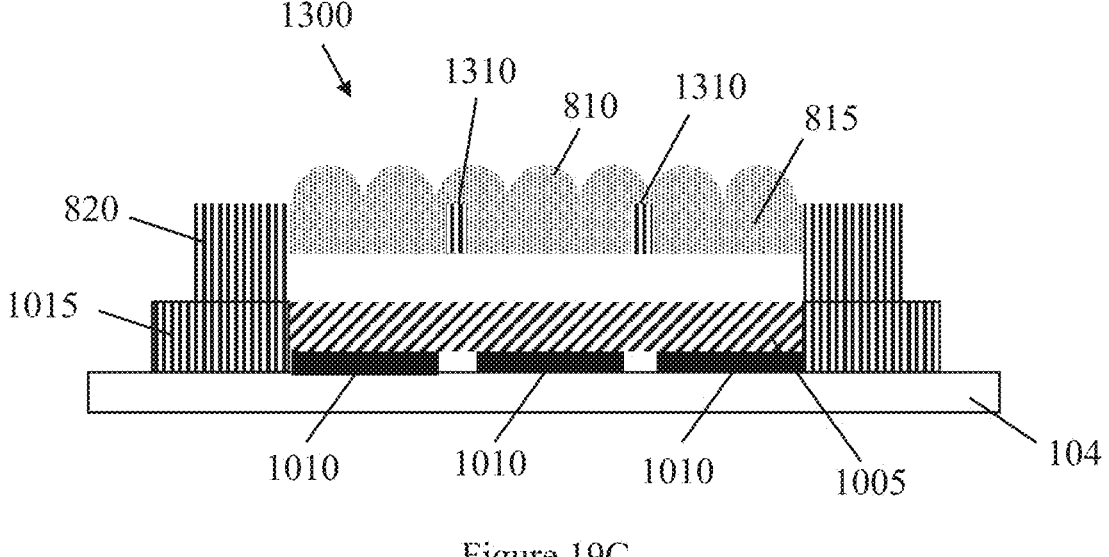
Figure 19D:
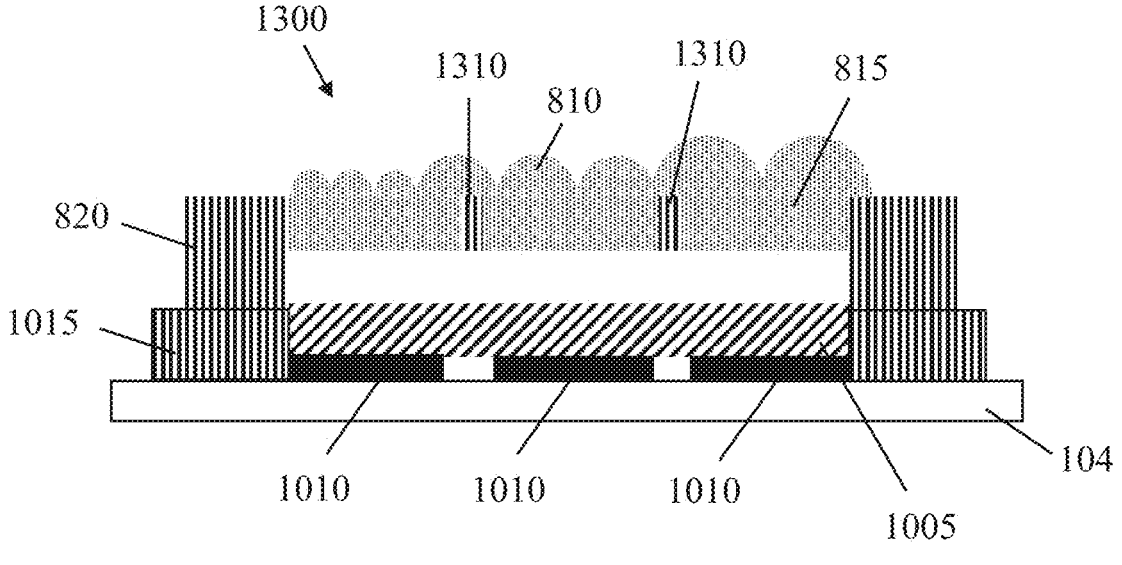
Figure 19E:
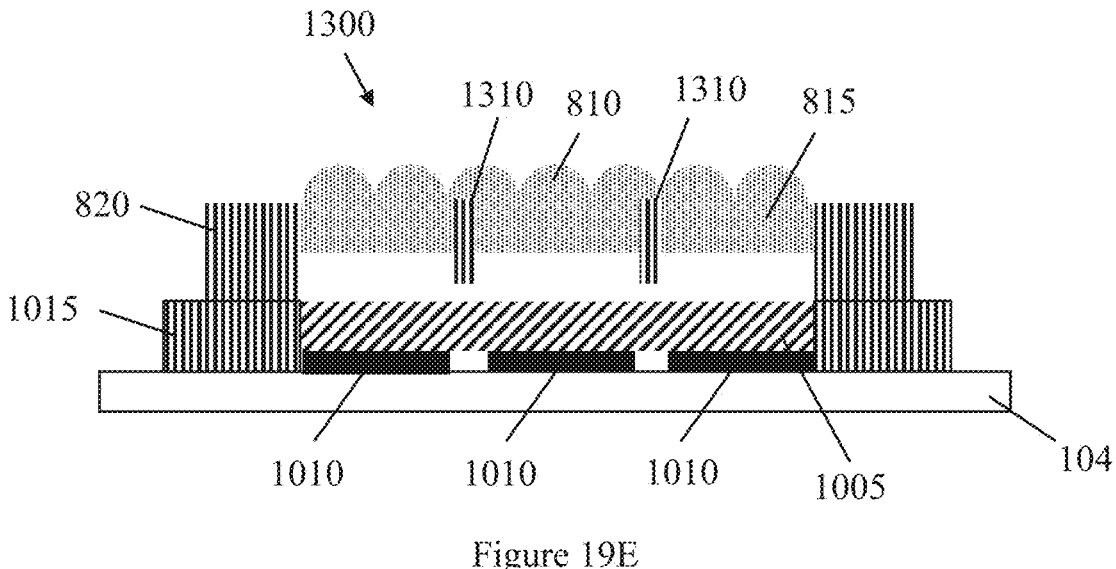
Figure 19F:
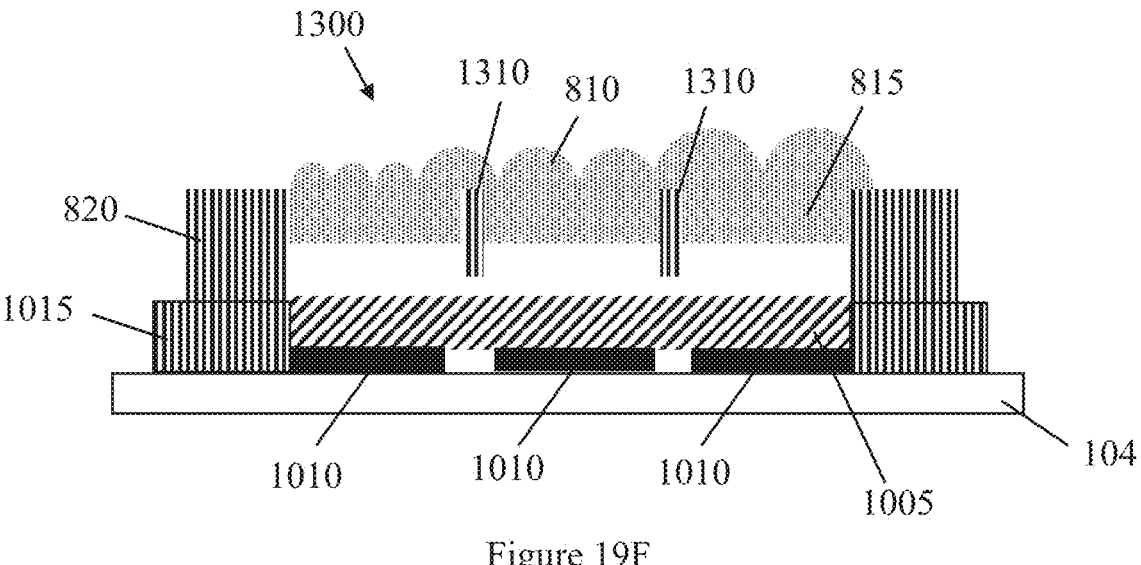
Figure 20A:
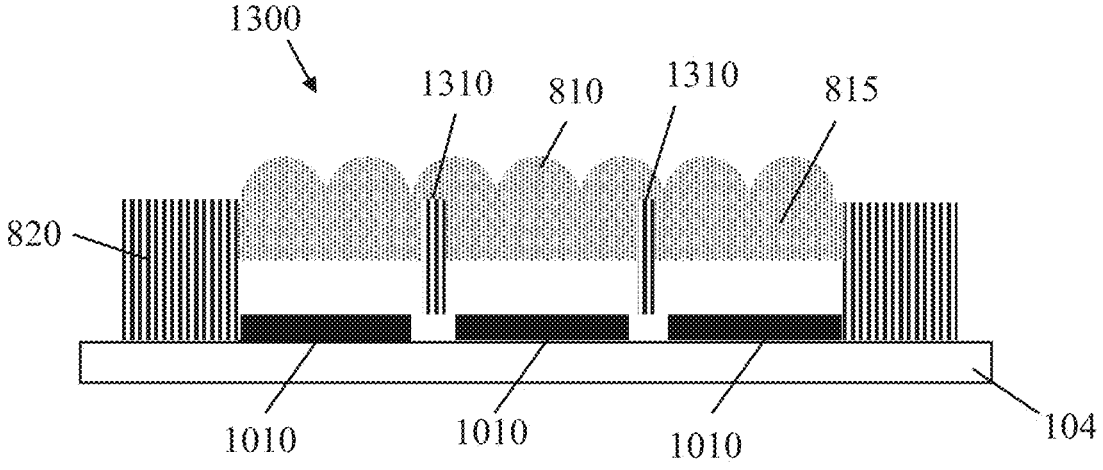
FIGS. 20A, 20B, 20C, 20D, 20E, and 20F show schematic cross-sectional views of example light emitting apparatus each comprising a microlens array spaced apart from an array of direct emitting LEDs and a plurality of optical isolation barriers disposed in the base of the microlens array.
Figure 20B:
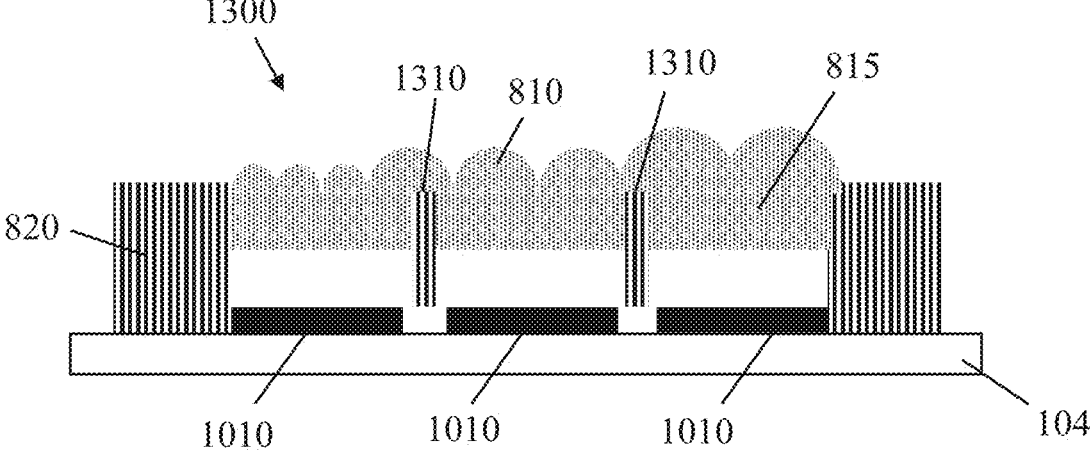
Figure 20C:
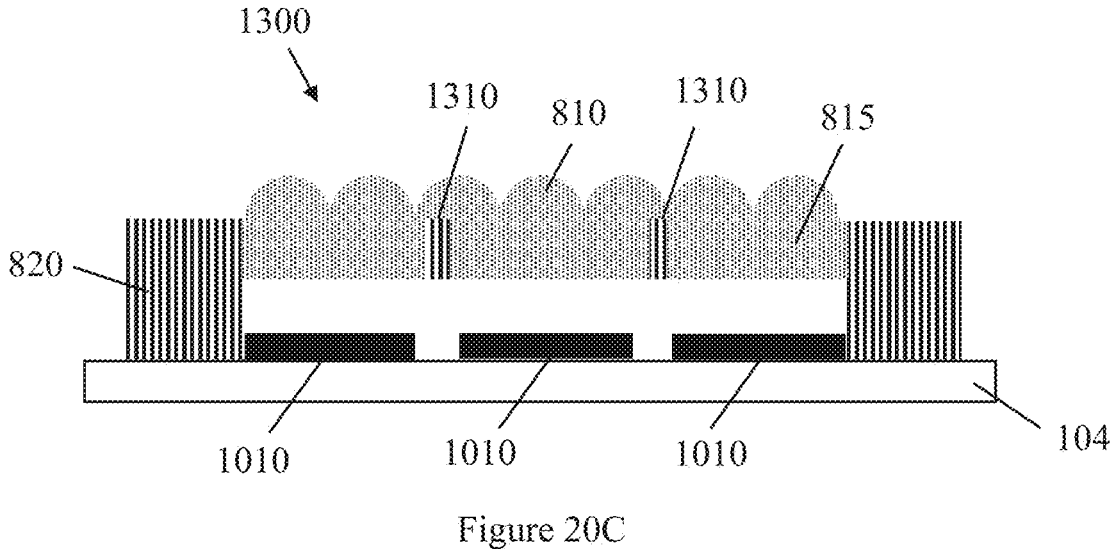
Figure 20D:
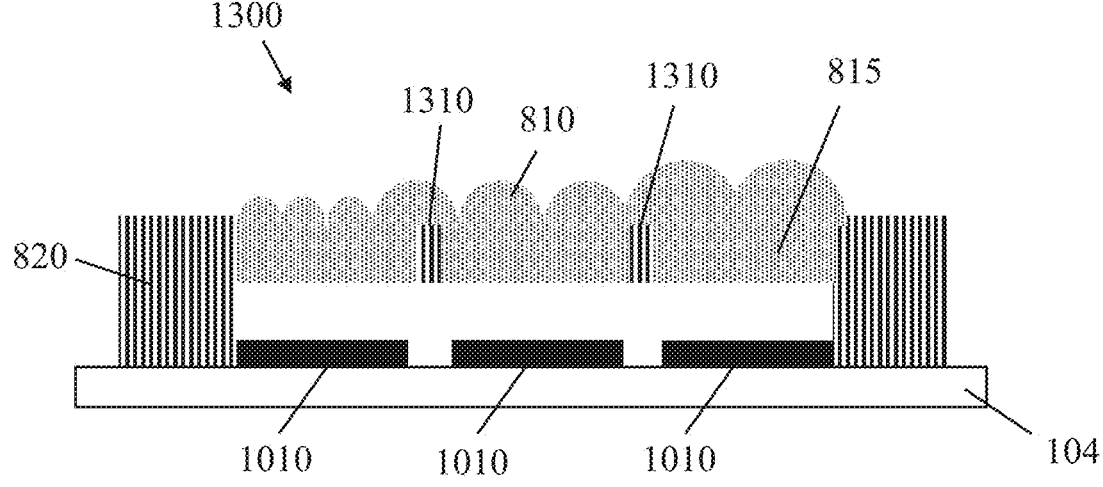
Figure 20E:
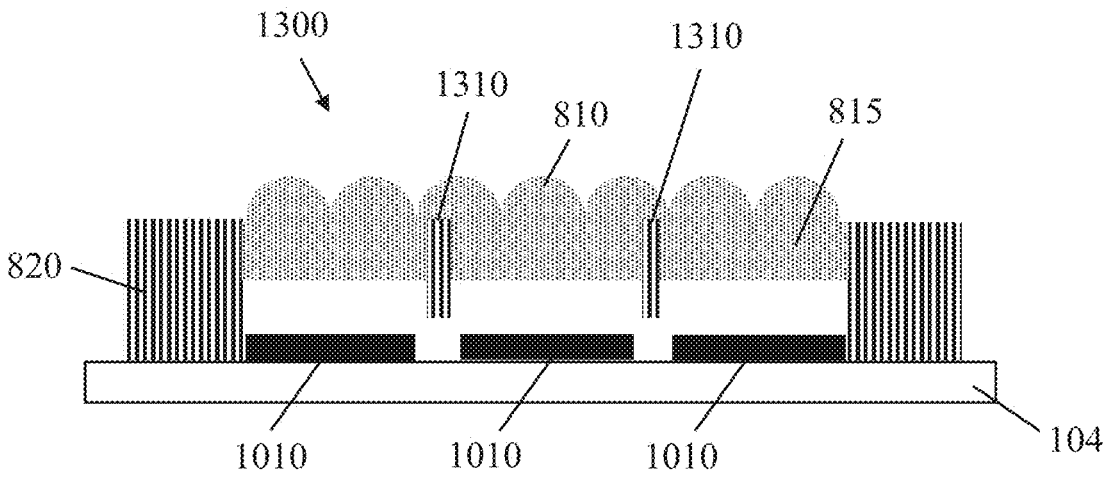
Figure 20F:
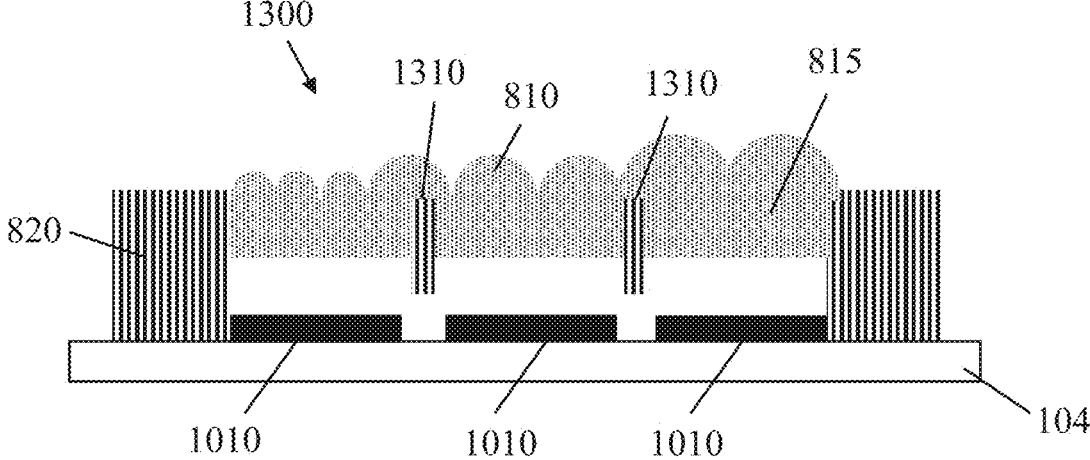

In variations in which optical isolation barriers 1310 are disposed entirely within the base 815 of the microlens array, the optical isolation barriers may, for example, extend from the surface of the base on which the microlenses are arranged to the opposite surface of the base that faces the wavelength converter or the LEDs (as illustrated in FIGS. 19C-19D), extend from the surface of the base on which the microlenses are arranged to a position intermediate between the two opposite surfaces of the base, extend from the surface of the base facing the wavelength converter or the LEDs to a position intermediated between the two opposite surfaces of the base, or extend along a range intermediate between the two opposite surfaces of the base without reaching either surface of the base.

The heights of optical isolation barriers 1310 measured perpendicularly to the plane of the base may vary with location in the microlens array.

A microlens array may comprise any suitable combination of the optical isolation barrier 1310 geometries described above.

The microlenses 810, base 815, spacer 820, and isolation barriers 1310 of microlens array 1300 may, for example, be formed as a single integral structure from a transparent material such as, for example, glass or silicone, with the spacer portion 810 of the microlens array and the isolation barriers 1310 comprising optically isolating material dispersed in the otherwise transparent material, which acts as a binder for the optically isolating material.

The following numbered clauses provide additional non-limiting aspects of the disclosure.

1. A light emitting apparatus comprising:
   a light emitting diode;
   a wavelength converting structure disposed on or adjacent to a light emitting surface of the light emitting diode; and
   an integrally formed microlens array comprising a plurality of microlenses arranged on a planar base and a spacer protruding out of the plane of the base along peripheral portions of the base, the microlens array spaced apart from a light emitting surface of the wavelength converting structure by the spacer and configured to collimate or partially collimate light emitted through the light emitting surface of the wavelength converting structure, the light emitting surface of the wavelength converting structure and a surface of the microlens array together defining an evacuated or air-filled gap between the wavelength converting structure and the microlens array.

2. The light emitting apparatus of clause 1, wherein the spacer comprises optically isolating material.

3. The light emitting apparatus of clause 1, wherein the microlens array is spaced apart from the light emitting surface of the wavelength converting structure by the spacer extending from peripheral portions of the base to peripheral portions of the light emitting surface of the wavelength converting structure.

4. The light emitting apparatus of clause 1, comprising an optically isolating side coat disposed adjacent to the wavelength converting structure, wherein the microlens array is spaced apart from the light emitting surface of the wavelength converting structure by the spacer extending from peripheral portions of the base to a surface of the optically isolating side coat.

5. The light emitting apparatus of any of clauses 1-4, wherein each microlens has a radius of curvature of 0.1 microns to 100 microns.

6. The light emitting apparatus of any of clauses 1-4 wherein each microlens has a radius of curvature, and the radii of curvature of the microlenses vary with the locations of the microlenses in the array.

7. A light emitting apparatus comprising:
   a light emitting diode; and
   an integrally formed microlens array comprising a plurality of microlenses arranged on a planar base and a spacer protruding out of the plane of the base along peripheral portions of the base, the microlens array spaced apart from a light emitting surface of the light emitting diode by the spacer and configured to collimate or partially collimate light emitted through the light emitting surface of the light emitting diode, the light emitting surface of the light emitting diode and a surface of the microlens array together defining an evacuated or air-filled gap between the light emitting diode and the microlens array.

8. The light emitting apparatus of clause 7, wherein the spacer comprises optically isolating material.

9. The light emitting apparatus of clause 7, wherein the microlens array is spaced apart from the light emitting surface of the light emitting diode by the spacer extending from peripheral portions of the base to peripheral portions of the light emitting surface of the light emitting diode.

10. The light emitting apparatus of clause 7, comprising an optically isolating side coat disposed adjacent to the light emitting diode, wherein the microlens array is spaced apart from the light emitting surface of the light emitting diode by the spacer extending from peripheral portions of the base to a surface of the optically isolating side coat.

11. The light emitting apparatus of any of clauses 7-10, wherein each microlens has a radius of curvature of 0.1 microns to 100 microns.

12. The light emitting apparatus of any of clauses 7-10, wherein each microlens has a radius of curvature, and the radii of curvature of the microlenses vary with the locations of the microlenses in the array.

13. A light emitting apparatus comprising:
a monolithic array of light emitting diodes;
a wavelength converting structure disposed on or adjacent to light emitting surfaces of the light emitting diodes;
an integrally formed microlens array comprising a plurality of microlenses arranged on a planar base and a spacer protruding out of the plane of the base along peripheral portions of the base, the microlens array spaced apart from a light emitting surface of the wavelength converting structure by the spacer and configured to collimate or partially collimate light emitted through the light emitting surface of the wavelength converting structure, the light emitting surface of the wavelength converting structure and a surface of the microlens array together defining an evacuated or air-filled gap between the wavelength converting structure and the microlens array.

14. The light emitting apparatus of clause 13, wherein the light emitting diodes or groups of the light emitting diodes are individually operable.

15. The light emitting apparatus of clause 13 or 14, wherein the light emitting diodes are microLEDs.

16. The light emitting apparatus of clause 13, wherein the spacer comprises optically isolating material.

17. The light emitting apparatus of clause 13, wherein the microlens array is spaced apart from the light emitting surface of the wavelength converting structure by the spacer extending from peripheral portions of the base to peripheral portions of the light emitting surface of the wavelength converting structure.

18. The light emitting apparatus of clause 13, comprising an optically isolating side coat disposed adjacent to the wavelength converting structure, wherein the microlens array is spaced apart from the light emitting surface of the wavelength converting structure by the spacer extending from peripheral portions of the base to a surface of the optically isolating side coat.

19. The light emitting apparatus of clause 13, comprising a plurality of optical isolation barriers disposed in the base of the microlens array with individual ones of the optical isolation barriers arranged parallel to and overlying streets in the array of light emitting diodes.

20. The light emitting apparatus of clause 19, wherein the optical isolation barriers intersect to form a grid.

21. The light emitting apparatus of clause 19, wherein the optical isolation barriers extend out of the base of the microlens array into the gap between the wavelength converting structure and the microlens array.

22. The light emitting apparatus of clause 21, wherein the optical isolation barriers extend across the gap between the wavelength converting structure and the microlens array.

23. The light emitting apparatus of any of clauses 13-22, wherein each microlens has a radius of curvature of 0.1 microns to 100 microns.

24. The light emitting apparatus of any of clauses 13-22, wherein each microlens has a radius of curvature, and the radii of curvature of the microlenses vary with the locations of the microlenses in the array.

25. A light emitting apparatus comprising:
a monolithic array of light emitting diodes; and
an integrally formed microlens array comprising a plurality of microlenses arranged on a planar base and a spacer protruding out of the plane of the base along peripheral portions of the base, the microlens array spaced apart light emitting surfaces of the light emitting diodes by the spacer and configured to collimate or partially collimate light emitted through the light emitting surfaces of the light emitting diodes, the light emitting surfaces of the array of light emitting diodes and a surface of the microlens array together defining an evacuated or air-filled gap between the array of light emitting diodes and the microlens array.

26. The light emitting apparatus of clause 25, wherein the light emitting diodes or groups of the light emitting diodes are individually operable.

27. The light emitting apparatus of clause 25 or 26, wherein the light emitting diodes are microLEDs.

28. The light emitting apparatus of clause 25, wherein the spacer comprises optically isolating material.

29. The light emitting apparatus of clause 25, wherein the microlens array is spaced apart from the light emitting surfaces of the light emitting diodes by the spacer extending from peripheral portions of the base to peripheral portions of the array of light emitting diodes.

30. The light emitting apparatus of clause 25, comprising an optically isolating side coat disposed adjacent to peripheral portions of the array of light emitting diodes, wherein the microlens array is spaced apart from the light emitting surfaces of the light emitting diodes by the spacer extending from peripheral portions of the base to a surface of the optically isolating side coat.

31. The light emitting apparatus of clause 25, comprising a plurality of optical isolation barriers disposed in the base of the microlens array with individual ones of the optical isolation barriers arranged parallel to and overlying streets in the array of light emitting diodes.

32. The light emitting apparatus of clause 31, wherein the optical isolation barriers intersect to form a grid.

33. The light emitting apparatus of clause 31, wherein the optical isolation barriers extend out of the base of the microlens array into the gap between the array of light emitting diodes and the microlens array.

34. The light emitting apparatus of clause 33, wherein the optical isolation barriers extend across the gap between the array of light emitting diodes and the microlens array.

35. The light emitting apparatus of any of clauses 25-34, wherein each microlens has a radius of curvature of 0.1 microns to 100 microns.

36. The light emitting apparatus of any of clauses 25-34, wherein each microlens has a radius of curvature, and the radii of curvature of the microlenses vary with the locations of the microlenses in the array.

37. An illumination system comprising:

the light emitting apparatus of any of clauses 1-36; and an optic or optical system arranged to form an output illumination beam from light emitted from the light emitting apparatus.

38. A display system comprising:

the light emitting apparatus of any of clauses 1-36;

a display; and an optic or optical system arranged to couple light from the light emitting apparatus into the display.

39. A mobile device comprising:

a camera;

a flash illumination system comprising the light emitting apparatus of any of clauses 1-360 and an optic or optical system arranged to form an output beam from light emitted from the light emitting apparatus, and a controller configured to operate the light emitting diodes of the light emitting apparatus to adapt the output beam to a field of view of the camera.

This disclosure is illustrative and not limiting. Further modifications will be apparent to one skilled in the art in light of this disclosure and are intended to fall within the scope of the appended claims.

What is claimed is:

1. A light emitting apparatus comprising:

a light emitting diode device comprising a monolithic array of light emitting diodes and a light emitting surface; and an integrally formed microlens array comprising a plurality of microlenses arranged on a planar base and a spacer protruding out of the plane of the base along peripheral portions of the base to be in direct contact with the light emitting surface of the light emitting diode device, the microlens array spaced apart from the light emitting surface of the light emitting diode device by the spacer and configured to collimate or partially collimate light emitted through the light emitting surface of the light emitting diode device, the light emitting surface of the light emitting diode device and a surface of the microlens array together defining an evacuated or air-filled gap between the light emitting surface of the light emitting diode device and the microlens array.

2. The light emitting apparatus of claim 1, wherein:

the light emitting surface of the light emitting diode device comprises light emitting surfaces of the light emitting diodes.

3. The light emitting apparatus of claim 1, wherein:

the light emitting diode device comprises a wavelength converting structure disposed on or adjacent to light emitting surfaces of the light emitting diodes; and the light emitting surface of the light emitting diode device is a light emitting surface of the wavelength converting structure.

4. The light emitting apparatus of claim 1, wherein the light emitting diodes or groups of the light emitting diodes are configured to be individually operable.

5. A light emitting apparatus comprising:

a light emitting diode device comprising a monolithic array of light emitting diodes and a light emitting surface;

an integrally formed microlens array comprising a plurality of microlenses arranged on a planar base and a spacer protruding out of the plane of the base along peripheral portions of the base, the microlens array spaced apart from the light emitting surface of the light emitting diode device by the spacer and configured to collimate or partially collimate light emitted through the light emitting surface of the light emitting diode device, the light emitting surface of the light emitting diode device and a surface of the microlens array together defining an evacuated or air-filled gap between the light emitting surface of the light emitting diode device and the microlens array; and a plurality of optical isolation barriers disposed in the base of the microlens array with individual ones of the optical isolation barriers arranged parallel to and overlying streets in the array of light emitting diodes.

6. The light emitting apparatus of claim 5, wherein the optical isolation barriers intersect to form a grid.

7. The light emitting apparatus of claim 5, wherein the optical isolation barriers extend out of the base of the microlens array into the gap between the light emitting surface of the light emitting diode device and the microlens array.

8. The light emitting apparatus of claim 7, wherein the optical isolation barriers extend across the gap between the light emitting surface of the light emitting diode device and the microlens array.

9. The light emitting apparatus of claim 1, wherein the spacer comprises optically isolating material.

10. The light apparatus of claim 1, wherein the microlens array is spaced apart from the light emitting surface of the light emitting diode device by the spacer extending from peripheral portions of the base to peripheral portions of the light emitting surface of the light emitting diode device.

11. A light emitting apparatus comprising:

a light emitting diode device comprising a monolithic array of light emitting diodes and a light emitting surface;

an integrally formed microlens array comprising a plurality of microlenses arranged on a planar base and a spacer protruding out of the plane of the base along peripheral portions of the base, the microlens array spaced apart from the light emitting surface of the light emitting diode device by the spacer and configured to collimate or partially collimate light emitted through the light emitting surface of the light emitting diode device, the light emitting surface of the light emitting diode device and a surface of the microlens array together defining an evacuated or air-filled gap between the light emitting surface of the light emitting diode device and the microlens array; and an optically isolating side coat disposed adjacent to the light emitting diode device, wherein the microlens array is spaced apart from the light emitting surface of the light emitting diode device by the spacer extending from peripheral portions of the base to a surface of the optically isolating side coat.

12. The light emitting apparatus of claim 1, wherein each microlens has a radius of curvature of 0.1 microns to 100 microns.

13. The light emitting apparatus of claim 1, wherein each microlens has a radius of curvature, and the radii of curvature of the microlenses vary with the locations of the microlenses in the array.

14. The light emitting apparatus of claim 1, wherein the light emitting diodes are microLEDs.

15. The light emitting apparatus of claim 1, wherein the gap between the light emitting surface of the light emitting diode device and the microlens array has a height perpendicular to the light emitting surface of the light emitting diode device of about 0.5 microns to about 100 microns.

16. The light emitting apparatus of claim 2, comprising a plurality of optical isolation barriers disposed in the base of the microlens array with individual ones of the optical isolation barriers arranged parallel to and overlying streets in the array of light emitting diodes, wherein the optical isolation barriers intersect to form a grid and the light emitting diodes are configured to be individually operable.

17. The light emitting apparatus of claim 3, comprising a plurality of optical isolation barriers disposed in the base of the microlens array with individual ones of the optical isolation barriers arranged parallel to and overlying streets in the array of light emitting diodes, wherein the optical isolation barriers intersect to form a grid and the light emitting diodes are configured to be individually operable.

18. An illumination system comprising:

the light emitting apparatus of claim 1, and an optic or optical system arranged to form an output illumination beam from light emitted from the light emitting apparatus.

19. A mobile device comprising:

a camera; and a flash illumination system comprising the light emitting apparatus of claim 1, and an optic or optical system arranged to form an output beam from light emitted from the light emitting apparatus.

\* \* \* \* \*